(12) United States Patent
Xie et al.

(10) Patent No.: US 12,177,118 B2
(45) Date of Patent: Dec. 24, 2024

(54) DATA FRAME SENDING METHOD AND NETWORK DEVICE

(71) Applicant: Huawei Technologies Co., Ltd., Shenzhen (CN)

(72) Inventors: Gang Xie, Wuhan (CN); Hao Li, Wuhan (CN); Yi Lin, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/189,401

(22) Filed: Mar. 24, 2023

(65) Prior Publication Data

US 2023/0254245 A1 Aug. 10, 2023

Related U.S. Application Data

(63) Continuation of application No. PCT/CN2021/120063, filed on Sep. 24, 2021.

(30) Foreign Application Priority Data

Sep. 27, 2020 (CN) .......................... 202011032653.X

(51) Int. Cl.
*H04L 45/50* (2022.01)
*H04B 10/27* (2013.01)
*H04L 45/00* (2022.01)

(52) U.S. Cl.
CPC ............. *H04L 45/50* (2013.01); *H04B 10/27* (2013.01); *H04L 45/22* (2013.01)

(58) Field of Classification Search
None
See application file for complete search history.

(56) References Cited

U.S. PATENT DOCUMENTS

| 7,248,561 | B2 | 7/2007 | Ishibashi et al. | |
| 2012/0106956 | A1* | 5/2012 | Rao | H04L 45/50 398/52 |
| 2013/0108273 | A1* | 5/2013 | Valiveti | H04J 3/1652 398/79 |
| 2017/0318364 | A1* | 11/2017 | Lin | H04J 3/1652 |
| 2018/0091251 | A1* | 3/2018 | Hanneman, Jr. | H04J 14/0283 |
| 2020/0287824 | A1* | 9/2020 | Dutta | H04L 45/20 |
| 2021/0289273 | A1* | 9/2021 | Xiang | H04Q 11/0062 |
| 2022/0239374 | A1* | 7/2022 | Su | H04J 3/1652 |

FOREIGN PATENT DOCUMENTS

| CN | 1625177 A | 6/2005 |
| CN | 101136844 A | 3/2008 |
| CN | 105471737 A | 4/2016 |
| EP | 2224649 A1 | 9/2010 |

* cited by examiner

*Primary Examiner* — June Sison
(74) *Attorney, Agent, or Firm* — Slater Matsil, LLP

(57) ABSTRACT

Embodiments of this application provide a data frame sending method and a network device. The method includes: A first node obtains routing label stack information of a first path, where the first path is used to transmit a service, and the routing label stack information indicates each node on the first path to establish a channel of the service on the node of the first path. The first node inserts the routing label stack information and service attribute information into a payload area of a first data frame, where the service attribute information indicates each node on the first path to configure a resource for the service. The first node sends the first data frame.

30 Claims, 11 Drawing Sheets

FAS: frame alignment signal    OTUk: optical transmission unit k

OH: overhead                    ODUk: optical data unit k

OPUk: optical payload unit k   FEC: forward error correction

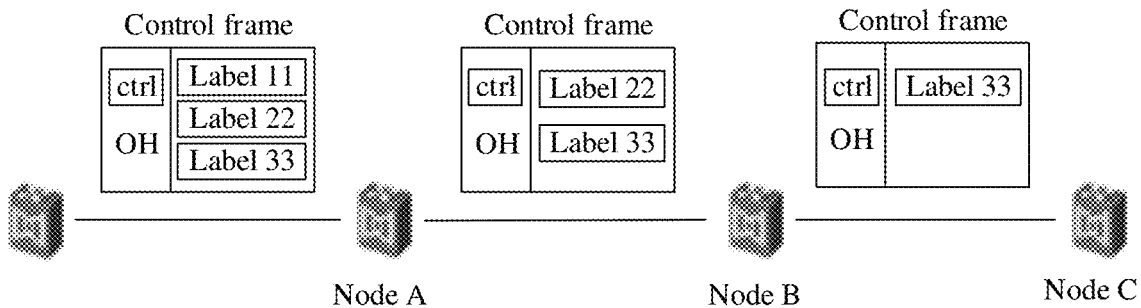

FIG. 7

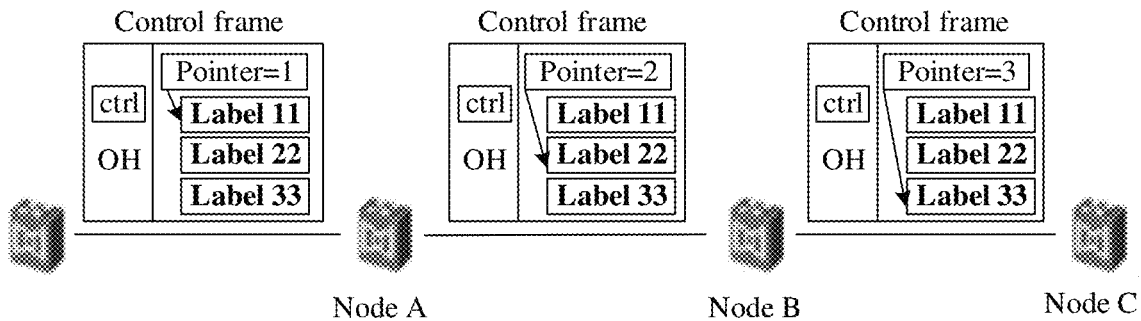

FIG. 8

| A first node obtains routing label stack information of a first path, where the first path is used to transmit a service, and the routing label stack information indicates each node on the first path to establish a channel of the service on the node of the first path | S910 |

| The first node inserts the routing label stack information and service attribute information into a payload area of a first data frame, where the service attribute information indicates each node on the first path to configure a resource for the service | S920 |

| The first node sends the first data frame | S930 |

FIG. 9

DATA FRAME SENDING METHOD AND NETWORK DEVICE

CROSS-REFERENCE TO RELATED APPLICATIONS

This application is a continuation of International Application No. PCT/CN2021/120063, filed on Sep. 24, 2021, which claims priority to Chinese Patent Application No. 202011032653.X, filed on Sep. 27, 2020. The disclosures of the aforementioned applications are hereby incorporated by reference in their entireties.

TECHNICAL FIELD

The present invention relates to the field of optical network technologies, and in particular, to a data frame sending method and a network device.

BACKGROUND

An automatically switched optical network (ASON) is an optical network that is defined by the International Telecommunication Union (ITU) and that is based on a distributed control plane and supports dynamic switching connections. The ASON uses an independent control plane to implement automatic connection management through various transport networks. The ASON supports dynamic allocation of a network bandwidth and scheduling connections. A network may be effectively optimized based on a change of client-layer information such as an IP data service volume. Compared with a conventional optical network, for a same network service requirement, the ASON can significantly reduce network construction costs and improve bandwidth utilization. In addition, the ASON can provide distributed network restoration, and greatly improve network reliability.

Currently, the ASON network has basically covered wavelength-division networks such as a metropolitan area network and a core backbone network. In the ASON network, each ASON node uses an open shortest path first (OSPF) protocol to obtain information about another node in the entire network, including node data and link data, then uses a constrained shortest path first (CSPF) algorithm to compute an end-to-end service path, and finally uses an RSVP-TE to establish the end-to-end service path. After a network fiber cut occurs, an end-to-end restoration path may be automatically established through a generalized multi-protocol label switching (GMPLS) and based on a resource reservation protocol-traffic engineering (RSVP-TE), to provide a service with real-time rerouting protection and restoration capabilities.

For a metropolitan area/core ASON network, when a service needs to be established through the RSVP-TE protocol, an RSVP path message is first encapsulated into an IP packet and then the IP packet is mapped to overhead bytes of a data frame. Each intermediate node needs to obtain the IP packet through parsing node by node. It takes a long time, occupies high overheads, and has a low path establishment speed.

SUMMARY

To resolve a problem of a low service routing speed and high occupied overheads, embodiments of this application provide a data frame sending method and a network device.

According to a first aspect, an embodiment of this application provides a data frame sending method. The method includes: A first node obtains routing label stack information of a first path, where the first path is used to transmit a service, and the routing label stack information indicates each node on the first path to establish a channel of the service on the node of the first path. The first node inserts the routing label stack information and service attribute information into a first data frame, where the service attribute information indicates each node on the first path to configure a resource for the service. The first node sends the first data frame.

According to the solution provided in this application, routing label stack information and service attribute information are carried in a flexible data frame, so that service routing information can be quickly transmitted to each node on a service path, and is used by each node to establish a channel for a service and configure a resource for the service, thereby shortening routing time. In addition, only OSU frame control signaling is used to complete a sending process of the data frame without occupying excessive overheads of a higher-order data frame, thereby improving network transmission efficiency.

With reference to the first aspect, in a possible implementation, the routing label stack information includes a plurality of labels, each of the plurality of labels is in a one-to-one correspondence with a channel through which each node on the first path transmits the service, and a correspondence is pre-configured in each node on the first path. The routing label is in a one-to-one correspondence with the channel of the service on each node, and the correspondence is pre-configured in each node, thereby reducing packet content and improving transmission efficiency. In addition, after obtaining the routing label stack information, each node may complete establishment of a cross-connection based on a correspondence between a label of the node and the channel of the service, thereby improving a sending speed of the data frame.

With reference to the first aspect, in a possible implementation, the routing label stack information may include only one global label. After obtaining the global label, the first node or another node on the first path completes establishment of the channel of the service based on the global label.

With reference to the first aspect, in another possible implementation, the service attribute information includes one or more of the following information: a service identifier ID, a bandwidth, a latency, a source node identifier ID, a destination node identifier ID, and a service path attribute. The service path attribute information may include a working path attribute, a protection path attribute, and a rerouting path attribute.

With reference to the first aspect, in a possible implementation, the first data frame is a flexible optical service unit frame, and a length of the first data frame is 192 bytes.

With reference to the first aspect, in a possible implementation, a payload area further includes a label number, where the label number identifies a number of nodes that receive the routing label stack information and the service attribute information on the first path. The label number is carried in the payload area, to enable each node to know a number of remaining nodes that are to perform forwarding. When the first data frame is forwarded to a last node, it may be determined that forwarding does not need to be continued, thereby saving routing time.

With reference to the first aspect, in a possible implementation, an overhead area of the first data frame further includes a signaling type field, where the type field indicates that the first data frame is a control frame and indicates a specific control type. The signaling type field is reserved in the overhead area, so that a current first data frame may be identified as a control frame, and a sending process of the data frame may specifically include scenarios such as path establishment, 1+1 protection, and rerouting, to distinguish from a data frame for transmitting a service and facilitate network management.

With reference to the first aspect, in a possible implementation, the type field indicates that the first data frame is a service creation control frame; the type field indicates that the first data frame is a service 1+1 protection creation control frame; or the type field indicates that the first data frame is a service rerouting control frame.

It should be noted that the type field may further indicate that the first data frame is a service deletion control frame. When the type field indicates that the first data frame is a service deletion control frame, the first data frame may carry only a service deletion control signaling identifier (Type field) and a service ID, and the routing label stack information may be optionally carried. In addition, the first data frame may be directly forwarded together with a service data flow and does not need to be forwarded through an egress port obtained based on the routing label stack information that is carried in the first data frame.

With reference to the first aspect, in a possible implementation, that the type field indicates that the first data frame is a service 1+1 protection creation control frame may specifically include: The type field indicates that the first data frame is a primary path creation control frame of the service; or the type field indicates that the first data frame is a standby path creation control frame of the service.

With reference to the first aspect, in a possible implementation, before the first node obtains the routing label stack information of the first path, the method further includes: The first node receives a routing request of the service; computes, based on the routing request, the first path for transmitting the service; and converts the first path into the routing label stack information. In this way, complex identification numbers such as a subrack, a board, a port, and a channel can be simplified into labels, which are easily obtained and identified by a device. This simplifies the sending process of the data frame.

With reference to the first aspect, in a possible implementation, after the first node sends the first data frame on the first path, the method further includes: The first node establishes a cross-connection for the service at a physical layer based on a first label in the routing label stack information. The first node configures a resource for the service at the physical layer based on the service attribute information.

It should be noted that the physical layer in this application may be understood as a data plane. The cross-connection is established for the service at the physical layer, that is, the cross-connection is established for the service by occupying a software or hardware resource of a device. For example, a cross-connection of the subrack, the board, or the port is established.

With reference to the first aspect, in a possible implementation, the first node pre-configures a mapping relationship between the first data frame and a first optical data unit frame. In this way, the sending process of the data frame may be simplified into cross-connection establishment and resource configuration, thereby shortening routing time.

According to a second aspect, an embodiment of this application provides a data frame sending method. The method includes: A second node receives a first data frame, where a payload area of the first data frame carries routing label stack information and service attribute information, the routing label stack information indicates each node on a first path to establish a channel of a service on each node, the service attribute information indicates each node on the first path to configure a resource for the service, and the first path is used to transmit the service. The second node obtains the routing label stack information and the service attribute information from the first data frame. The second node establishes, based on the routing label stack information, a channel for the second node to transmit the service; and configures a resource for the service based on the service attribute information.

According to the solution provided in this application, the first data frame carries the routing label stack information and the service attribute information, so that service routing information can be quickly transmitted to each node on a service path. Each node establishes, based on the routing label stack information and the service attribute information, a channel for transmitting a service and configures a resource for the service, thereby shortening routing time. In addition, only first data frame control signaling is used to complete a sending process of a data frame without occupying excessive overheads of a higher-order data frame, thereby improving network transmission efficiency.

With reference to the second aspect, in a possible implementation, the routing label stack information includes a plurality of labels, each of the plurality of labels is in a one-to-one correspondence with a channel through which each node on the first path transmits the service, and a correspondence is pre-configured in each node on the first path. The routing label is in a one-to-one correspondence with the channel for transmitting the service, and the correspondence is pre-configured in each node, thereby reducing packet content and improving transmission efficiency. In addition, after obtaining the routing label stack information, each node may complete establishment of a cross-connection based on a correspondence between a label of the node and the channel of the service, thereby improving a sending speed of the data frame.

With reference to the second aspect, in another possible implementation, the service attribute information includes one or more of the following information: a service identifier ID, a bandwidth, a latency, a source node identifier ID, a destination node identifier ID, and a service path attribute.

With reference to the second aspect, in a possible implementation, the first data frame is a flexible optical service unit frame, and a length of the first data frame is 192 bytes.

With reference to the second aspect, in a possible implementation, the payload area further includes a label number, and the label number identifies a number of nodes that receive the routing label stack information and the service attribute information on the first path. The label number is carried in the payload area, to enable each node to know a number of remaining nodes that are to perform forwarding. When an OSU frame is forwarded to a last node, it may be determined that forwarding does not need to be continued, thereby saving routing time.

With reference to the second aspect, in a possible implementation, an overhead area of the first data frame further includes a signaling type field, where the type field indicates that the first data frame is a control frame and indicates a specific control type. The signaling type field is reserved in the overhead area, so that a current first data frame may be identified as a control frame, and a sending process of the data frame may specifically include scenarios such as path establishment, 1+1 protection, and rerouting, to distinguish from a data frame for transmitting a service and facilitate network management.

With reference to the second aspect, in a possible implementation, the type field indicates that the first data frame is a service creation control frame; the type field indicates that the first data frame is a service 1+1 protection creation control frame; or the type field indicates that the first data frame is a service rerouting control frame.

With reference to the second aspect, in a possible implementation, that the type field indicates that the first data frame is a service 1+1 protection creation control frame may specifically include: The type field indicates that the first data frame is a primary path creation control frame of the service; or the type field indicates that the first data frame is a standby path creation control frame of the service.

With reference to the second aspect, in a possible implementation, before the first node obtains the routing label stack information of the first path, the method further includes: The first node receives a routing request of the service; computes, based on the routing request, the first path for transmitting the service; and converts the first path into the routing label stack information. In this way, complex identification numbers such as a subrack, a board, a port, and a channel can be simplified into labels, which are easily obtained and identified by a device. This simplifies the sending process of the data frame.

With reference to the second aspect, in a possible implementation, after the first node sends the first data frame on the first path, the method further includes: The first node establishes a cross-connection for the service at a physical layer based on a first label in the routing label stack information. The first node configures a resource for the service at the physical layer based on the service attribute information.

With reference to the second aspect, in a possible implementation, that the second node obtains the routing label stack information from the first data frame includes:

The second node obtains a second label from the first data frame in a stack manner, where the second label specifically indicates the second node to establish a channel for transmitting the service; or the second node obtains the second label from the first data frame in a pointer manner.

With reference to the second aspect, in a possible implementation, after the second node obtains the second label from the first data frame, the method further includes: The second node forwards the first data frame to another node, where the another node is a downstream node of the second node on the first path.

With reference to the second aspect, in a possible implementation, the second node establishes a channel for the second node to transmit the service based on the routing label stack information, including: The second node establishes a connection for the service at a physical layer based on a second label.

With reference to the second aspect, in a possible implementation, the method further includes: The second node configures a bandwidth for the service at the physical layer based on the service attribute information. The second node first forwards the first data frame to the downstream node, and then establishes the connection for the service at the physical layer based on the second label. In this way, the service routing information may be transmitted to a peer end of a path as quickly as possible, and each node on the path may complete establishment of the cross-connection and the resource configuration in parallel, thereby implementing quick routing of the service.

With reference to the second aspect, in a possible implementation, the second node pre-configures a mapping relationship between the first data frame and a second optical data unit frame. In this way, the sending process of the data frame may be simplified into cross-connection establishment and resource configuration, thereby shortening routing time.

According to a third aspect, an embodiment of this application provides a network device, including: a processing unit, configured to obtain routing label stack information of a first path, where the first path is used to transmit a service, and the routing label stack information indicates each node on the first path to establish a channel for transmitting the service, where the processing unit is further configured to insert the routing label stack information and service attribute information into a first data frame of an optical service unit, where the service attribute information indicates each node on the first path to configure a resource for the service; and a sending unit, configured to send the first data frame.

With reference to the third aspect, in a possible implementation, the routing label stack information includes a plurality of labels, each of the plurality of labels is in a one-to-one correspondence with a channel through which each network device on the first path transmits the service, and a correspondence is pre-configured in each network device. The routing label is in a one-to-one correspondence with the channel for transmitting the service, and the correspondence is pre-configured in each node, thereby reducing packet content and improving transmission efficiency. In addition, after obtaining the routing label stack information, each node may complete establishment of a cross-connection based on a correspondence between a label of the node and the channel of the service, thereby improving a sending speed of the data frame.

With reference to the third aspect, in a possible implementation, the service attribute information includes one or more of the following information: a service identifier ID, a bandwidth, a latency, a source node identifier ID, and a destination node identifier ID.

With reference to the third aspect, in a possible implementation, the first data frame includes a payload area, and the routing label stack information and the service attribute information are carried in the payload area. The routing label stack information and the service attribute information are carried in the payload area of the first data frame, so that excessive overheads can be avoided, extraction costs of a device can be reduced, and sending of the data frame can be quickly completed.

With reference to the third aspect, in a possible implementation, the payload area further includes a label number field, and a label number identifies a number of nodes that receive the routing label stack information and the service attribute information on the first path.

With reference to the third aspect, in a possible implementation, the first data frame further includes a signaling type field, where the type field indicates that the first data frame is a control frame and indicates a specific control type. The signaling type field is reserved in an overhead area, so that a current first data frame may be identified as a control frame, and a sending process of the data frame may specifically include scenarios such as path establishment, 1+1 protection, and rerouting, to distinguish from a data frame for transmitting a service and facilitate network management.

With reference to the third aspect, in a possible implementation, the type field indicates that the first data frame is a service creation control frame; the type field indicates that the first data frame is a service 1+1 protection creation control frame; or the type field indicates that the first data frame is a service rerouting control frame.

With reference to the third aspect, in a possible implementation, that the type field indicates that the first data frame is a service 1+1 protection creation control frame may specifically include: The type field indicates that the first data frame is a primary path creation control frame of the service; or the type field indicates that the first data frame is a standby path creation control frame of the service.

With reference to the third aspect, in a possible implementation, the network device further includes a receiving unit. Before the processing unit obtains the routing label stack information of the first path, the receiving unit is configured to receive a routing request of the service; and the processing unit is further configured to: compute, based on the routing request, the first path for transmitting the service; and converts the first path into the routing label stack information.

With reference to the third aspect, in a possible implementation, after the sending unit sends the first data frame, the processing unit is further configured to establish a connection for the service at a physical layer based on a first label in the routing label stack information; and is further used to configure a resource for the service at the physical layer based on the service attribute information.

With reference to the third aspect, in a possible implementation, the processing unit pre-configures a mapping relationship between the first data frame and a first optical data unit frame.

According to a fourth aspect, an embodiment of this application provides a network device, including: a receiving unit, configured to receive a first data frame, where the first data frame carries routing label stack information, and the routing label stack information indicates each node on a first path to establish a channel for transmitting a service; and a processing unit, configured to obtain the routing label stack information and service attribute information from the first data frame; further configured to establish, based on the routing label stack information, a channel used by a second node to transmit the service; and further adapted to configure a resource for the service based on the service attribute information.

With reference to the fourth aspect, in a possible implementation, the routing label stack information includes a plurality of labels, each of the plurality of labels is in a one-to-one correspondence with a channel through which each network device on the first path transmits the service, and a correspondence is pre-configured in each network device.

With reference to the fourth aspect, in a possible implementation, the service attribute information includes one or more of the following information: a service identifier ID, a bandwidth, a latency, a source node identifier ID, and a destination node identifier ID.

With reference to the fourth aspect, in a possible implementation, the first data frame is a flexible optical service unit frame, and a length of the first data frame is 192 bytes.

With reference to the fourth aspect, in a possible implementation, the payload area further includes a label number, and the label number identifies a number of nodes that receive the routing label stack information and the service attribute information on the first path.

With reference to the fourth aspect, in a possible implementation, the first data frame further includes a signaling type field, where the type field indicates that the first data frame is a control frame and indicates a specific control type. The signaling type field is reserved in an overhead area, so that a current first data frame may be identified as a control frame, and a sending process of the data frame may specifically include scenarios such as path establishment, 1+1 protection, and rerouting, to distinguish from a data frame for transmitting a service and facilitate network management.

With reference to the fourth aspect, in a possible implementation, the type field indicates that the first data frame is a service creation control frame; the type field indicates that the first data frame is a service 1+1 protection creation control frame; or the type field indicates that the first data frame is a service rerouting control frame.

With reference to the fourth aspect, in a possible implementation, that the type field indicates that the first data frame is a service 1+1 protection creation control frame may specifically include: The type field indicates that the first data frame is a primary path creation control frame of the service; or the type field indicates that the first data frame is a standby path creation control frame of the service.

With reference to the fourth aspect, in a possible implementation, that the processing unit obtains the routing label stack information from the first data frame is: The processing unit obtains a second label from the first data frame in a stack manner, where the second label specifically indicates the network device to establish a channel for transmitting the service; or the processing unit obtains a second label from the first data frame in a pointer manner.

With reference to the fourth aspect, in a possible implementation, the network device further includes a sending unit. After the processing unit obtains the second label from the first data frame, the sending unit is configured to forward the first data frame to another network device, where the another network device is a downstream network device of the network device on the first path.

With reference to the fourth aspect, in a possible implementation, the processing unit is specifically configured to establish a connection for the service at a physical layer based on the second label. The processing unit is further adapted to configure a bandwidth for the service at the physical layer based on the service attribute information.

With reference to the fourth aspect, in a possible implementation, the processing unit pre-configures a mapping relationship between the first data frame and a second optical data unit frame.

According to a fifth aspect, an embodiment of this application provides a computer program product. When the computer program is executed by a computer, the computer is enabled to separately implement the method according to any one of the first aspect or the possible implementations of the first aspect and the method according to any one of the second aspect or the possible implementations of the second aspect.

According to a sixth aspect, an embodiment of this application further provides a computer-readable storage medium that stores a computer program or instructions. When the program or the instructions are run, a device is driven to perform the method according to any one of the first aspect or the possible implementations of the first aspect and the method according to any one of the second aspect or the possible implementations of the second aspect.

According to a seventh aspect, an embodiment of this application further provides a communication system. The communication system includes the network device and the node in the foregoing embodiments.

BRIEF DESCRIPTION OF THE DRAWINGS

To describe the technical solutions in embodiments of this application or in the background more clearly, the following describes the accompanying drawings for describing embodiments of this application or the background.

FIG. 7 is a schematic flowchart of obtaining a label in a stack manner according to an embodiment of this application;

FIG. 8 is a schematic flowchart of obtaining a label in a pointer manner according to an embodiment of this application;

FIG. 9 is a flowchart of a service routing method according to an embodiment of this application;

DETAILED DESCRIPTION OF ILLUSTRATIVE EMBODIMENTS

The technical solutions in embodiments of this application may be applied to an ASON. For ease of understanding the technical solutions in embodiments of this application, the following briefly describes some terms and technologies used in embodiments of this application.

1. Node

A node is used to represent an independent hardware entity in a network, and is usually a transport network device. For example, in FIG. 1, there are four nodes: a node 1, a node 2, a node 3, and a node 4.

Figure 1:
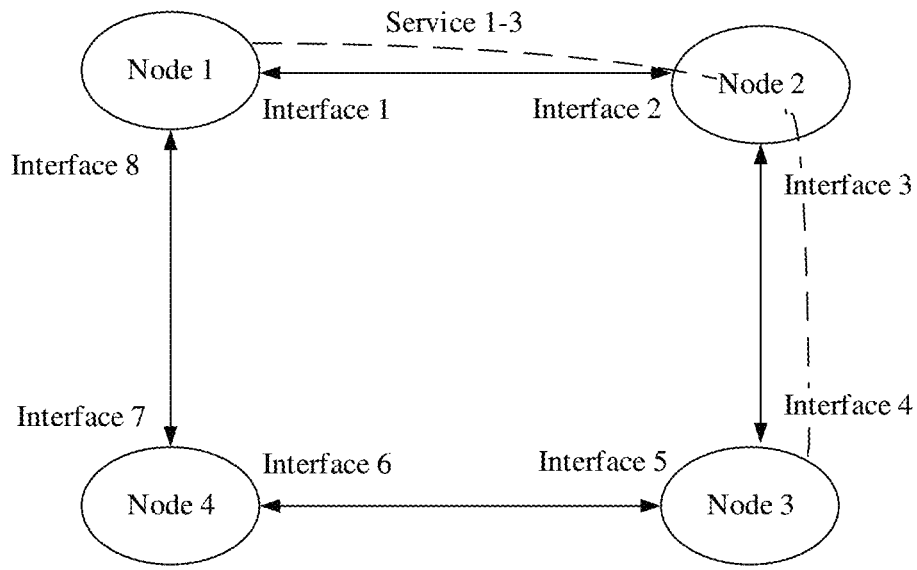
FIG. 1 is a schematic architectural diagram of an ASON network according to an embodiment of this application.

It should be understood that an ASON shown in FIG. 1 is merely an example, and does not constitute any limitation on the protection scope of this application. A quantity of nodes included in the ASON may be more than four nodes, or a quantity of nodes included in the ASON may alternatively be greater than or equal to two.

2. Interface

An interface is a physical port that is on a node and that is configured to send and receive a network protocol message and traffic data. For example, there are eight interfaces in FIG. 1: an interface 1, an interface 2, an interface 3, an interface 4, an interface 5, an interface 6, an interface 7, and an interface 8 respectively. The interface 1 and the interface 8 are physical ports of the node #1, the interface 2 and the interface 3 are physical ports of the node #2, the interface 4 and the interface 5 are physical ports of the node #3, and the interface 6 and the interface 7 are physical ports of the node #4.

In this application, the interface may also be referred to as a port, for example, an ingress port or an egress port. It should be noted that a port on a node in this application has three meanings: (1) a channel: for example, ingress port 1-egress port 1 indicates that data enters a node from the ingress port 1 and then is sent out from the egress port 1, and represents a channel of the data; (2) a wavelength: data is sent out from a specific port, indicating that the data is sent out through a wavelength corresponding to the port; (3) a mapping relationship with an OTN frame: before being sent, a flexible data frame needs to be first mapped to a payload area of an optical data unit ODUk in a specific manner. Data is sent out from a specific port, indicating that a flexible data frame carrying the data is mapped to a specific position in the payload area of the ODUk frame based on a specific mapping relationship, and then is sent out through the ODUk frame.

3. Link

In embodiments of this application, a connection between two adjacent nodes is referred to as a link. A link may be indicated by a link (node-interface). Whether a link exists between two adjacent nodes may be used to indicate whether information such as a network protocol message and/or traffic data can be forwarded between the two adjacent nodes. For example, if a link exists between two adjacent nodes, information such as a network protocol message and/or traffic data can be forwarded between the two adjacent nodes. Similarly, if no link exists between two adjacent nodes, information such as a network protocol message and/or traffic data cannot be forwarded between the two adjacent nodes.

For example, a link (node 1-interface 1, node 2-interface 2) indicates that information such as a network protocol message and/or traffic data can be received on the node 2 and the interface 2 after being sent from the interface 1 of the node 1.

The ASON shown in FIG. 1 has eight links: a link 1-2 (node 1-interface 1—>node 2-interface 1), a link 1-4 (node 1-interface 8—>node 4-interface 7), a link 2-1 (node 2-interface 2—>node 1-interface 1), a link 2-3 (node 2-interface 3—>node 3-interface 4), a link 3-2 (node 3-interface 4—>node 2-interface 3), a link 3-4 (node 3-interface 5—>node 4-interface 6), a link 4-3 (node 4-interface 6—>node 3-interface 5), and a link 4-1 (node 4-interface 7—>node 1-interface 8).

4. Service

A service indicates that a physical channel connection is established between two nodes, and data traffic can be sent from a source node and received by a destination node. For example, in FIG. 1, a service 1-3 indicates that a connective data channel exists between a node 1 and a node 3.

It should be noted that in this application, unless otherwise specified, a channel usually represents a physical channel. For example, a service channel represents a physical channel between a service source node and a service destination node. A channel of a service on a node may represent a cross-connection relationship of the service on the node from an ingress port to an egress port, or may represent an optical-layer wavelength channel. This is not limited in this application.

An ASON network may provide functions of fast end-to-end establishment, query, deletion, attribute modification, and restoration for the service through an RSVP-TE protocol. A network management system issues a service creation command to a source node network element. Then, the source node network element implements routing computation and initiates a service configuration process through an RSVP-TE signaling protocol. Cross-connections are established node by node from a source node to a downstream node. In this way, a service is created. This method fully uses routing and signaling functions of each network element, thereby shortening service configuration time. As shown in FIG. 1, specific steps of signaling RSVP-TE path establishment of the service 1-3 are as follows: The source node 1 computes a service path through a CSPF (constrained shortest path first): node 1-node 2-node 3. Along the computed path, the source node carries end-to-end path information, and specifies an interface of the link 1-2 to send a path message (which is a type of RSVP-TE protocol packet) to the intermediate node 2. After receiving the signaling message, the node 2 obtains cross-connection configuration association information of this node through parsing and establishes a reverse cross-connection. The intermediate node 2 carries an end-to-end path message and specifies an interface of the link 2-3 to send a path message to the destination node 3. Similarly, the destination node 3 obtains a corresponding cross-connection configuration message through parsing and establishes a reverse cross-connection of the destination node 3. The destination node 3 sends a Resv message (which is a type of RSVP-TE protocol packet) to the source node 1 through the intermediate node 2, and establishes a forward cross-connection on each node along the path. In a same process, the source node 1 sends a path message to the destination node 3 through the intermediate node 2, and enables alarm monitoring on the service along the path. The destination node 3 sends a Resv message to the source node 1 through the intermediate node 2 for confirmation. In the entire process, the RSVP-TE signaling automatically completes end-to-end configuration establishment of the service 1-3.

In a static network, establishment of a service is to perform establishment, deletion, query, and attribute modification by the network management system on a manual per-station configuration basis, and end-to-end automation process cannot be implemented. As shown in FIG. 1, if the service 1-3 is created through the network management system, the service path: node 1-node 2-node 3 first needs to be manually planned and single-node cross-connection configuration is performed node by node. After cross-connections are configured for all nodes, the service 1-3 is established in an end-to-end manner. In the entire process, the service needs to be manually established on a per-station configuration basis, which is inefficient.

5. Service Path

A service path may include a working path, a restoration path, a protection path, and the like, and is used to carry data transmission of a service. The service path is a route between a first node and a last node. One or more nodes may exist between the first node and the last node. The first node of the service path represents a sending node of service data, and the last node of the service path represents a receiving node of the service data. A service path may be represented by a service (first node-last node).

Because the service path represents the route from the first node to the last node, and may also be referred to as an end-to-end service path, where "end-to-end" represents the first node to the last node.

In addition, the ASON may provide functions of end-to-end establishment, query, deletion, attribute modification, and restoration for the service path through the RSVP-TE protocol. The end-to-end establishment of the service path includes: The network management system issues a service path creation command to the first node and then the first node computes a route and initiates a service path configuration process through an RSVP-TE signaling protocol. Cross-connections are established node by node from the first node to a downstream node, so that the end-to-end establishment of the service path is completed.

The service path in this application includes both a working path and a protection path. Switching (or switchover) of the service path may indicate that the service is switched from the working path to the protection path, or indicate that the service is switched back from the protection path to the working path.

6. Flexible Optical Service Unit Frame

An optical transport network (OTN) has become a mainstream technology used in a transport network because of a high bandwidth, a large capacity, high reliability, a low latency, and the like. The OTN may be applied to networks such as a backbone network, a metropolitan area core network, and an aggregation network, and is further extended to an access network. A data frame structure used in the OTN network is an OTN frame, and the OTN frame may also be referred to as an OTN transmission frame. The OTN frame is used to carry various service data, and provides abundant management and monitoring functions. In addition to providing a high-bandwidth transmission capability such as n*1.25 Gbps and n*5 Gbps, the OTN further needs to have a transmission capability of as low as several megabits per second in the future.

Based on a conventional OTN frame structure, a liquid OTN introduces a flexible service-oriented container, namely, a flexible optical service unit (OSUflex) frame. A channel bandwidth (for example, n*2.4 Mbit/s, where n indicates a number of channels) is defined flexibly to efficiently carry a small-granularity signal. The OSUflex changes an original encapsulation size, and can be directly mapped to a higher-order optical data unit k (ODUk) channel, where k represents different rate levels. For example, k=1 represents 2.5 Gbps, and k=4 represents 100 Gbps.

Figure 2:
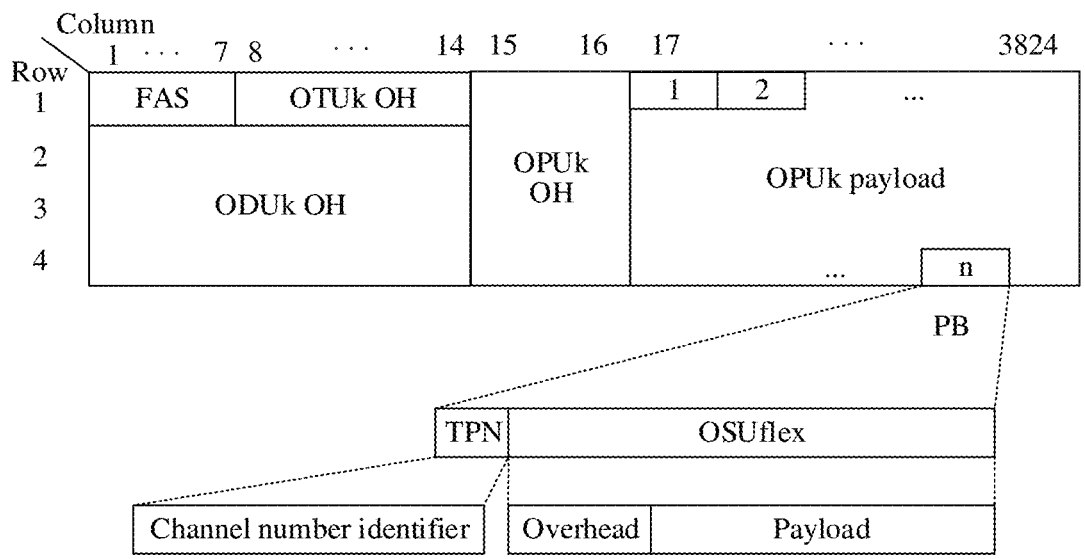
FIG. 2 is a schematic structural diagram of an OSU frame according to an embodiment of this application.

In embodiments of this application, the OTN frame may be an OSUflex frame, and the OSUflex frame may also be referred to as an OSU frame for short. FIG. 2 is a schematic structural diagram of an OSU frame according to an embodiment of this application. As shown in FIG. 2, an optical payload unit k frame (OPUk) or an OPUflex is divided into a plurality of payload blocks (PBs), and each PB includes an OSU frame and an index number TPN corresponding to the OSU frame. When a plurality of OSU frames are mapped to the OPUk/Flex frame, the TPN may be used as a unique channel identifier of the OSU frame at a service layer. Each OSU frame includes two parts: an overhead area and a payload area. The overhead area includes but is not limited to overhead information such as a signaling type, a version identifier, and a check bit, and the payload area is used to carry service data information. A length of the OSU frame is usually a fixed size, for example, a length is 192 bytes, 240 bytes, 128 bytes, or 64 bytes.

The following further describes the technical solutions in embodiments of this application with reference to the accompanying drawings in embodiments of this application. In descriptions of this application, unless otherwise specified, "/" represents "or". For example, A/B may represent A or B. In this specification, "and/or" is only an association relationship for describing associated objects, and represents that three relationships may exist. For example, A and/or B may indicate the following three cases: Only A exists, both A and B exist, and only B exists. In addition, in the descriptions of this application, unless otherwise specified, "a plurality of" means two or more than two. In addition, to distinctly describe the technical solutions in embodiments of this application, terms such as "first" and "second" are used in embodiments of this application to distinguish between same items or similar items that provide basically same functions or purposes. A person skilled in the art may understand the terms such as "first" and "second" do not limit a number or an execution order. In addition, the terms such as "first" and "second" do not indicate a definite difference.

A network architecture and a service scenario described in embodiments of this application are intended to distinctly describe the technical solutions in embodiments of this application, and do not constitute a limitation on the technical solutions provided in embodiments of this application. A person of ordinary skill in the art may know that with evolution of the network architecture and emergence of a new service scenario, the technical solutions provided in embodiments of this application are also applicable to a similar technical problem.

With diversified development of network services, scenarios such as a VR game and a video service have a higher requirement on network performance. In the scenarios such as the VR game and the video service, a user obtains a VR rendering cloud service address in advance through a public network and then initiates channel connection establishment as required when starting a game/video. To reduce waiting time and improve user experience, usually, time for establishing a channel connection should be as short as possible.

Figure 3:
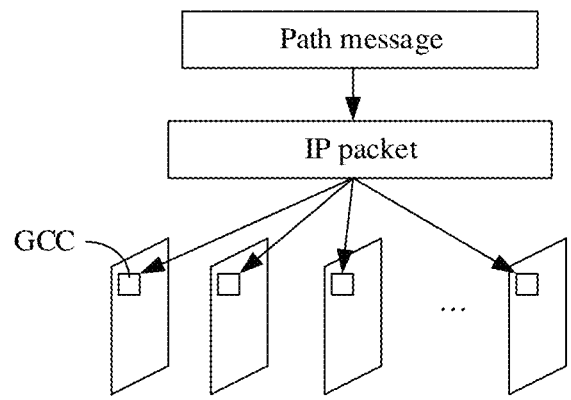
FIG. 3 is a schematic diagram of a data frame sending method.

FIG. 3 shows a data frame sending method. A first node of a service first encapsulates an RSVP path message into an IP packet, and then maps the IP packet to a data communication network (DCN). For example, the IP packet is mapped to a general communication channel (GCC) overhead byte of an optical transport network (OTN) data frame. Each intermediate node needs to parse the IP packet node by node, and establishes a path for the service or reroutes the service based on the IP packet. This process is time-consuming, and because of excessively small available overheads, a transmission speed is low. Consequently, service configuration efficiency is low, and performance is poor.

To improve service establishment and restoration speeds of a network, and improve user experience, embodiments of this application provide a data frame sending method and a network device. Fast establishment and/or rerouting of the service are/is implemented based on OSU frame channel associated control signaling, thereby improving network performance.

It should be noted that the data frame sending method in embodiments of this application includes a process of establishing a working path of the service, a process of establishing a 1+1 protection path of the service, and a process of rerouting after a fault occurs on the working path of the service. Therefore, routing in this application represents end-to-end establishment of a service path.

Figure 4:
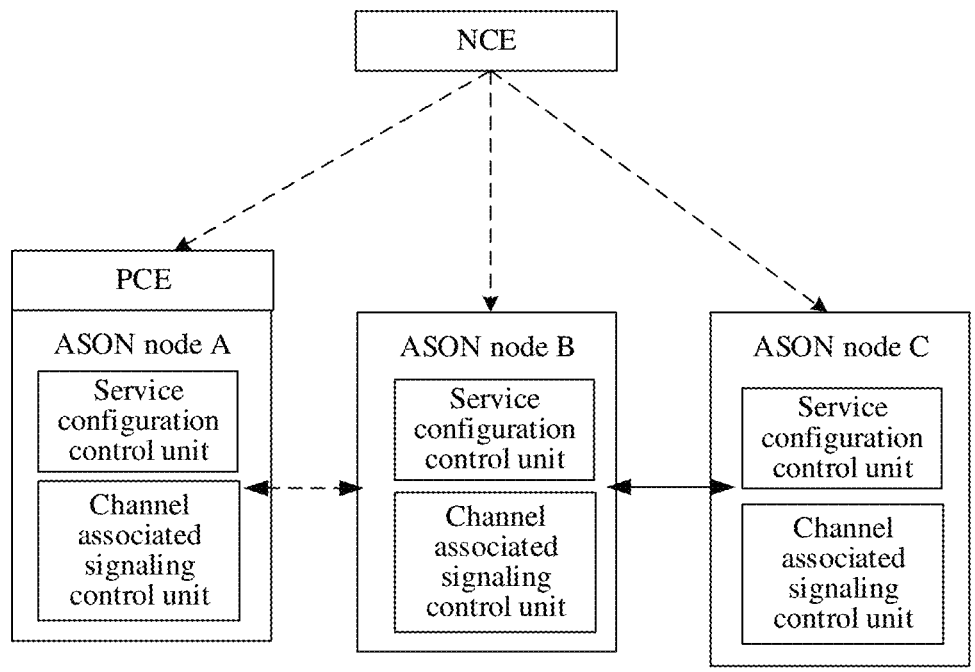
FIG. 4 is a schematic diagram of a node configuration in an ASON network according to an embodiment of this application.

FIG. 4 is a schematic diagram of a node configuration in an ASON network according to an embodiment of this application. As shown in FIG. 4, the architecture includes a network cloud engine (NCE), a node A, a node B, and a node C. A service configuration control unit and a channel associated signaling control unit are deployed on each node.

The ASON architecture further includes a network device for path computation. For example, the network device includes a path computation element (PCE) controller, that is, at least one PCE controller is disposed in the ASON. Alternatively, the network device is a node having a path computation function. For example, a PCE controller is deployed on at least one node in the ASON. For another example, a path computation function module is deployed on at least one node in the ASON.

The NCE is used to automatically provision and delete a service.

When the node A is a first node of a service, the node A may include the PCE controller. The NCE or the PCE controller is specifically configured to pre-configure a mapping relationship between all OSU frame channels and optical channel data unit k (ODUk) channels on an optical port of a device, to simplify an OSU frame channel associated service into cross-connection and bandwidth configurations of a service path.

The service configuration control unit is configured to establish, delete, update, and reestablish the service path, and is further configured to establish a cross-connection and configure a resource for a single-node service.

The channel associated signaling control unit is configured to process channel associated control signaling of an OSU frame, including creation control signaling and deletion control signaling of the service.

It should be understood that FIG. 4 is a schematic diagram provided merely for ease of understanding of this application, and does not constitute any limitation on the protection scope of this application. Names of the foregoing units are merely examples. The units shown in FIG. 4 are replaced with another unit or module that can implement a same function.

Figure 5:
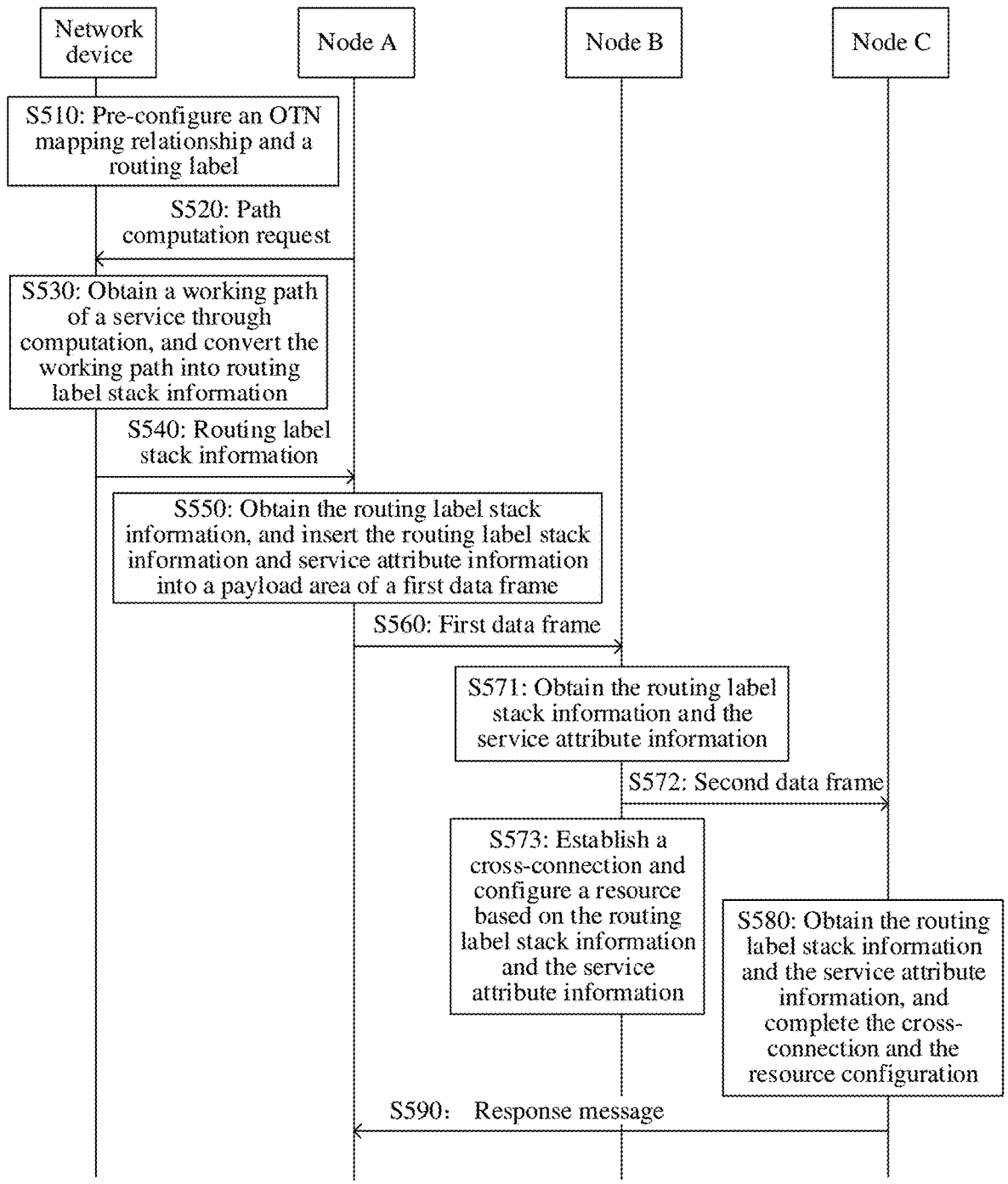
FIG. 5 is a system time-sequence diagram of a data frame sending method according to an embodiment of this application.

FIG. 5 is a system time-sequence diagram of a data frame sending method according to an embodiment of this application. The method may be applied to an ASON network. The network may include a plurality of nodes shown in FIG. 4.

This embodiment is described by using an example in which a path is established for a restoration service through channel associated control signaling of an OSU frame. In this embodiment, a node having a path computation function and a PCE controller are collectively referred to as a network device, and the network device may obtain, through path computation, a working path that carries a service. For example, the working path of the service includes a first node A, an intermediate node B, and a last node C, where the first node A may exchange information with the network device through a communication protocol. It should be noted that the network device may be the first node of the service.

The data frame sending method in FIG. 5 includes at least all or some of the following steps.

S510: The network device pre-configures an OTN mapping relationship and a routing label.

Specifically, before a service is created, the network device pre-configures a mapping relationship between an OSU frame and an ODUk channel. Through the foregoing pre-configuration, the network device may simplify a service path establishment process into a cross-connection and resource configuration, thereby improving service configuration efficiency.

In addition, the network device further separately allocates a routing label to OSU frame channels on different subracks, boards, and ports, where the label is used to uniquely identify, in a station node, a channel for transmitting a first service, and then configures all routing labels for nodes respectively. For example, each routing label attribute is four bytes that are in a one-to-one correspondence with a subrack, a board, a port, and a channel number in a node. In addition, the network device may store a routing label of each node in the device.

S520: The node A sends a path computation request to the network device.

The node A is a first node of the service. After receiving a service creation request, the node A requests the network device to compute a path that carries the service.

S530: The network device obtains a working path of the service through computation, and converts the working path into routing label stack information.

In this embodiment of this application, the network device can obtain the service and a topology in a network, then determine, based on network-wide routing TE and bandwidth information, the working path that carries the service, and then convert the working path into the routing label stack information. The routing label stack information indicates each node on the working path to establish a channel for transmitting a service. Specifically, the routing label stack information represents an ordered set of labels, and may include one or a plurality of labels. The plurality of labels are sorted in a specific order, for example, may be sorted in an obtaining order of each label. Each label is in a one-to-one correspondence with the channel for transmitting the service in a node on the working path.

For example, the network device determines that a path that carries the first service is a first path, where the first path includes a node through which the service passes and service channel information in the node. For example, the first path is node A (subrack 1-board 1-port 1-channel 1)-node B (subrack 2-board 2-port 2-channel 2)-node C (subrack 3-board 3-port 3-channel 3). Then, the network device converts the first path into the routing label stack information, for example, node A (first label)-node B (second label)-node C (third label).

It should be noted that in this embodiment of this application, establishment indicates that a service channel in the node is in an available/active state, or more specifically, establishment indicates that a cross-connection of the channel for transmitting the service in the node has been established.

S540: The network device delivers the routing label stack information to the node A.

For example, the network device delivers the routing label stack information to the node A through a path computation element communication protocol (PCEP) message. Alternatively, the network device delivers the routing label stack information to the node A through a protocol message that has a same function as the PCEP. Specifically, the network device delivers the routing label stack information to the node A through a field (for example, an extended PCEP field) newly added in original signaling between the network device and the node A.

Based on an identity of the network device in the network, the following two manners are included.

Manner 1: The network device is a PCE.

The network device is a PCE controller disposed in the network, where the PCE controller is a device that is deployed independently of the first node on the foregoing working path. Therefore, in the manner 1, after converting the working path into the routing label stack information, the network device needs to deliver the routing label stack information to the first node A of the service.

For example, the routing label stack information may be one message or may be a collective name of a plurality of messages. That is, the routing label stack information may be sent to the first node A through one message, or may be sent to the first node A through a plurality of messages.

Manner 2: The network device is the first node of the service.

If the network device is the first node A of the service, the node A may obtain routing information of the working path through computation, and convert the routing information of the working path into the routing label stack information. Different from the manner 1, in the manner 2, the network device does not need to send the routing label stack information to the first node, that is, S540 does not need to be performed.

S550: The node A obtains the routing label stack information of the service path, and inserts the routing label stack information and service attribute information into a payload area of a first data frame.

The node A obtains the routing label stack information from the protocol message, and inserts the routing label stack information into a payload area field of the first data frame. In addition, the node A may further insert the service attribute information into the payload area field of the first data frame, to indicate a node on the service path to configure a physical resource for the service. The service attribute information includes at least one of the following information: a service identifier ID, a bandwidth, a latency, a source node identifier ID, a destination node identifier ID, and a service path attribute. The service path attribute indicates a control type of the first data frame. For example, a path currently established through the first data frame is a service working path, or a service protection path, or a rerouting path.

For example, the first data frame may be specifically a flexible optical service unit OSU frame with a length of 192 bytes.

Figure 6:
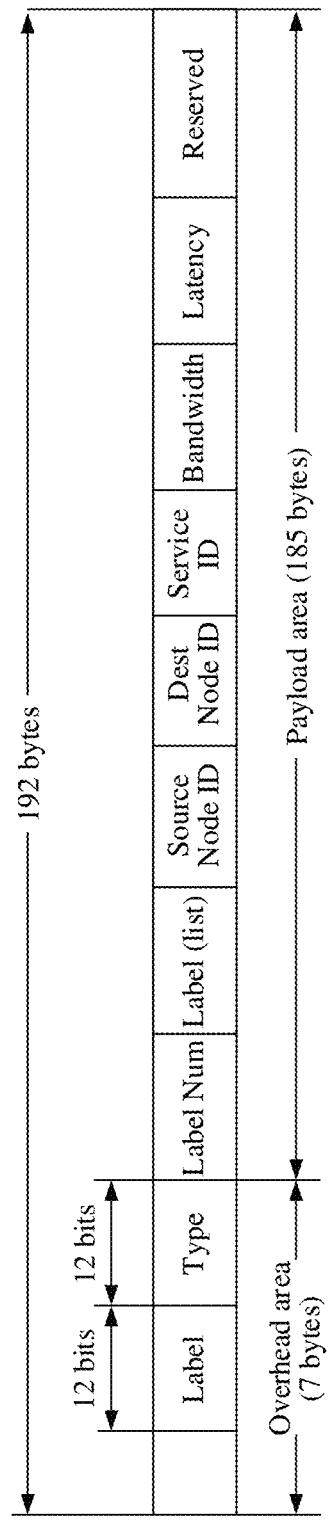
FIG. 6 is a schematic diagram of a signaling format of an OSU frame according to an embodiment of this application.

In an example, for a signaling format of the OSU frame, refer to FIG. 6. As shown in FIG. 6, the length of the OSU frame is 192 bytes, where an overhead area includes 7 bytes, and a payload area includes 185 bytes. A 12-bit label is reserved in the overhead area of the OSU frame, and identifies a channel number of the OSU frame. For example, the label identifies a channel of the service on the node A: ingress port 1-egress port 1, and the node A may directly send the OSU frame through the egress port 1 based on the channel number. It should be noted that, that the node A sends the OSU frame through the egress port 1 may be understood as that the OSU frame is sent by using a wavelength corresponding to the egress port, and the OSU frame is first mapped to a higher-order ODUk data frame pre-configured on the egress port, and then sent through the egress port 1. In this way, the service path establishment process is simplified into a cross-connection and resource configuration, which can improve service configuration efficiency. A 12-bit type is further reserved in the overhead area of the OSU frame, and the type identifies that a type of the OSU frame is a control frame and identifies a specific control type. For example, the most significant four bits 1000 of the type identify that the OSU frame is a control signaling type, and the least significant eight bits 00000010 identify that the OSU frame is specifically a service path establishment control type. The payload area is a customized field, including the routing label stack information and the service attribute information.

The payload area may include the service attribute information such as Label Num, Label (list), Source Node ID, Dest Node ID, Service ID, Bandwidth, and Latency.

For a specific field meaning of the customized field in the payload area, refer to Table 1 below:

TABLE 1

| Field name | Meaning | Value |
|---|---|---|
| Label Num | Number of end-to-end routing labels | 16-bit value |
| Label (list) | Routing label stack information, and Label of each node, identifying an egress interface | 32-bit value |
| Source Node ID | Source node ID of a service, identifying a first node of the service | 32-bit value |
| Dest Node ID | Last node ID of the service, identifying the last node of the service (optional) | 32-bit value |
| Service ID | Service ID, and unique identifier ID of an end-to-end path | 32-bit value |
| Bandwidth | Service bandwidth attribute | 32-bit value |
| Latency | Service latency attribute | 32-bit value |
| Reserved | Reserved byte, for future service attribute extension | |

As shown in Table 1, the customized field in the payload area may include the attribute information such as the label number Label Num, the routing label stack information (list) Label (list), the source node ID Source Node ID, the destination node ID Dest Node ID, the service identifier ID Service ID, the bandwidth, and the latency Latency. The label number indicates a quantity of nodes that receive the routing label stack information and the service attribute information on the service path. A remaining byte is a reserved byte for writing another extended attribute of the service. For example, the another extended attribute of the service may be a service path attribute, and the service path attribute indicates a specific control type of a current OSU frame. Each label in the routing label stack information is in a one-to-one correspondence with a channel through which a node transmits a service. For example, the first label in the routing label stack information corresponds to a channel: subrack 1-board 1-port 1-channel 1 for transmitting a service in the node A, and indicates the node A to establish a cross-connection for the service at a physical layer. For another example, the second label in the routing label stack information corresponds to a channel: subrack 2-board 2-port 2-channel 2 for transmitting a service in the node B, and indicates the node B to establish a cross-connection for the service at the physical layer. A correspondence between a label and a channel needs to be pre-configured in each node.

It should be noted that when the payload area includes the service path attribute, both the type of the overhead area and the service path attribute of the payload area in this embodiment may identify a specific control type of the OSU frame. A specific field for identification identify may be selected. This is not limited in this embodiment.

S560: The node A sends the first data frame to the node B.

The node A sends the first data frame to the node B. The payload area of the first data frame carries the routing label stack information and the service attribute information. The routing label stack information may be a label list, including a plurality of labels, and each of the plurality of labels is in a one-to-one correspondence with a channel of the service on each node of the working path.

Before the node A sends the first data frame to the node B, the method further includes: The first data frame is mapped to a higher-order ODUk frame, and then the ODUk frame is sent to the node B.

After the node A sends the first data frame to the node B, the method further includes: The node A establishes a cross-connection for the service at the physical layer based on the first label in the routing label stack information; and configures a resource for the service at the physical layer based on the service attribute information, for example, allocates a bandwidth to the service. The reason why the first data frame is first sent to the node B, and then cross-connection establishment and resource configuration are performed is to transmit the first data frame to a peer end of the working path as soon as possible, and each node completes the cross-connection and the resource configuration of the service channel in parallel, thereby shortening routing time.

S570: The node B obtains the routing label stack information and the service attribute information in the first data frame, and forwards the routing label stack information and the service attribute information to the node C.

This step specifically includes the following steps.

S571: The node B obtains the routing label stack information and the service attribute information in the first data frame.

S572: The node B forwards a second data frame including the label attribute information and the service attribute information to the node C.

S573: The node B establishes a cross-connection for the service at the physical layer based on the routing label stack information, and configures a resource for the service based on the service attribute information.

After obtaining the routing label stack information and the service attribute information, the node B directly forwards the second data frame including the label attribute information and the service attribute information to a downstream node of the node B, that is, the node C, and then performs processing of the node. The reason for this is that the first data frame including routing information is enabled to be transmitted to the peer end of the working path as soon as possible, and each node completes the cross-connection and the resource configuration of the service channel in parallel, thereby shortening routing time.

It should be noted that the second data frame may have the same content as the first data frame, or the second data frame has one second label less than the first data frame. To distinguish from the first data frame, a data frame forwarded by the node B to the node C is referred to as a second data frame.

It should be understood that the routing label stack information includes a plurality of labels, and that the node B obtains the routing label stack information may be understood as obtaining a second label that is in the plurality of labels and that corresponds to a channel used by the node B to transmit the service. Specifically, the node B obtains the second label in two manners.

Manner 1: A Stack Manner

In the stack manner, each time the first data frame passes through a node, a label is popped up, for example, the $1^{st}$ label is popped up each time, and is used to: establish a cross-connection of a service channel of the current node and provide a forwarding egress port of first data frame control signaling.

FIG. 7 is a schematic flowchart of obtaining a label by a node in a stack manner. As shown in FIG. 7, a first data frame sent by a node A to a node B includes an overhead area and a payload area, where the overhead area identifies that the first data frame is a control frame, and the payload area is used to carry routing label stack information for establishing a service channel, for example, a label number-Label 11-Label 22-Label 33. The label number indicates a total number of labels included in the routing label stack information. The label 11 corresponds to a service channel of the node A, the label 22 corresponds to a service channel of the node B, and the label 33 corresponds to a service channel of a node C. The initial first data frame of the node A carries three labels, which are respectively the label 11, the label 22, and the label 33. The $1^{st}$ label 11 is popped up from the initial first data frame at the node A, and is used by the node A to establish a cross-connection of the service channel. In addition, the label 11 further indicates a forwarding egress port of the first data frame. After the label 11 is popped up, the label 22 becomes the $1^{st}$ label in the routing label stack information, and the node A continues to forward the first data frame to the node B. When the first data frame arrives at the node B, the current $1^{st}$ label 22 is popped up, is used by the node B to establish a cross-connection of the service channel, and further indicates a forwarding egress port of the first data frame. After the label 22 is popped up, the label 33 becomes the $1^{st}$ label and a unique remaining label. The node B continues to forward the first data frame to the node C. After the first data frame arrives at the node C, the unique label 33 is popped up, and is used by the node C to establish a cross-connection of the service channel. Because the label 33 is a last label, after the label 33 is popped up, if identifying that there is no remaining label in the first data frame, the node C determines that forwarding does not need to be continued.

It should be noted that a label is obtained in a stack manner, and after obtaining a label, each node needs to re-edit a packet and then forwards the packet.

The node obtains the label in the stack manner, and packets in the first data frame gradually decrease with forwarding, so that a transmission speed is faster.

Manner 2: A Pointer Manner

In this manner, the routing label stack information includes a label pointer field, indicating a label that needs to be obtained by a current node. As shown in FIG. 8, a first data frame sent by a node A to a node B includes an overhead area and a payload area, where the overhead area identifies that the first data frame is a control frame, and the payload area is used to carry routing label stack information for establishing a service channel, for example, a label number-Label 11-Label 22-Label 33. The label number indicates a total number of labels included in the routing label stack information, the label 11 corresponds to a service channel of the node A, the label 22 corresponds to a service channel of the node B, and the label 33 corresponds to a service channel of a node C. Different from the stack manner, the routing label stack information in this manner includes a pointer, indicating a label that needs to be obtained by the current node. Each time a node is passed through, the routing label stack information remains unchanged, and the pointer is increased by 1.

For example, on the node A, pointer=1, indicating that the node A needs to obtain the $1^{st}$ label 11. On the node B, pointer=2, indicating that the node B needs to obtain the $2^{nd}$ label 22. On the node C, pointer=3, indicating that the node C needs to obtain the $3^{rd}$ label 33.

It should be noted that a label is obtained in a pointer manner, the routing label stack information included in each node is the same, and only a pointer value changes.

The label is obtained by the node in the pointer manner. A structure of the routing label stack information remains unchanged, and only the pointer value needs to be changed. Processing is simple.

After forwarding a second data frame to a downstream node of the node B, the node B establishes a cross-connection for a service at a physical layer based on the routing label stack information, establishes a channel for transmitting the service, and configures a resource for the service based on service attribute information, for example, allocates a bandwidth for the service. In this way, routing information can be transmitted to a peer end of a working path as soon as possible, and each node completes the cross-connection and the resource configuration of the service channel in parallel, thereby shortening routing time.

S580: The node C obtains the routing label stack information and the service attribute information in the second data frame, and completes establishment of the cross-connection and the resource configuration.

It should be noted that the node C is a last node of the service, and when it is identified that only the last label in the routing label stack information is left, it is determined that forwarding does not need to be continued. The node C separately completes establishment of the cross-connection and the resource configuration based on the routing label stack information and the service attribute information. For a specific process, refer to the foregoing steps. Details are not described herein again.

S590: The node C sends a response message to the node A, indicating that the service is successfully created.

Specifically, when the network device is another device deployed independently of the node A, for example, the PCE controller, the node C may also send a response message to the another device. For example, the node C sends a response message to an NCE.

FIG. 9 is a flowchart of a service routing method according to an embodiment of this application. The method may be performed by the node A in FIG. 5, that is, a first node of a service.

The method includes at least the following steps.

S910: A first node obtains routing label stack information of a first path.

In this embodiment, the first path is used to transmit a first service, and the routing label stack information indicates each node on the first path to establish a channel of the first service on the node.

For example, before the routing label stack information is obtained, the method may further include: The first node receives a routing request of the first service.

For example, the first node requests a network device to compute a working path for transmitting the first service; or the first node computes a working path for transmitting the first service.

For example, after the first node obtains the first path through computation for transmitting the first service, the method may further include: The first node converts the first path into the routing label stack information.

S920: The first node inserts the routing label stack information and service attribute information into a payload area of a first data frame.

The service attribute information indicates each node on the first path to configure a resource for the first service, including one or more of the following information: a service identifier ID, a bandwidth, a latency, a source node identifier ID, a destination node identifier ID, and a service path attribute.

The routing label stack information includes a plurality of labels, each of the plurality of labels is in a one-to-one correspondence with a channel through which each node on the first path transmits the first service, and a correspondence is pre-configured in each node on the first path.

For example, the first data frame may be a flexible optical service unit OSU frame. For example, the OSU frame includes an overhead area and a payload area, and both may be customized. For example, the routing label stack information and the service attribute information are carried in the payload area.

For example, the payload area of the OSU frame further includes a label number, to identify a number of nodes that receive the routing label stack information and the service attribute information on the first path.

For example, the overhead area of the OSU frame includes a signaling type field, and the type field indicates that the OSU frame is a control frame and indicates a specific control type. For example, the type field includes 12 bits, where the most significant four bits 1000 identify that the OSU frame is a control signaling type, and the least significant eight bits 00000010 identify that the OSU frame is specifically a service path establishment control type. For example, the type field may indicate that the OSU frame is a first service creation control frame. For another example, the type field may indicate that the OSU frame is a first service 1+1 protection creation control frame. For another example, the type field may further indicate that the OSU frame is a first service rerouting control frame.

For example, when the type field indicates that the OSU frame is a service 1+1 protection creation control frame, there are two cases: The type field indicates that the OSU frame is a primary path creation control frame of the first service; or the type field indicates that the OSU frame is a standby path creation control frame of the first service.

S930: The first node sends the first data frame.

After the first node sends the first data frame, the method further includes: The first node establishes a connection for the service at a physical layer based on a first label in the routing label stack information; and the first node configures a resource for the service at the physical layer based on the service attribute information.

Figure 10:
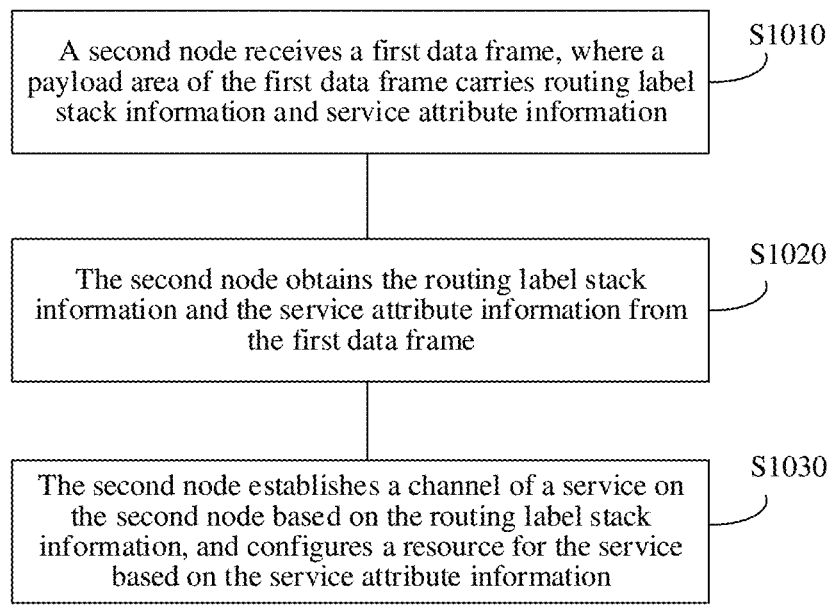
FIG. 10 is a flowchart of another service routing method according to an embodiment of this application.

FIG. 10 is a flowchart of another service routing method according to an embodiment of this application. The method may be performed by the node B and the node C in FIG. 5.

The method includes at least the following steps.

S1010: A second node receives a first data frame.

A payload area of the first data frame carries routing label stack information and service attribute information. The routing label stack information indicates each node on a first path to establish a channel for transmitting a first service, and the service attribute information indicates each node on the first path to configure a resource for the first service. The first path is a path that is computed by a network device and that is used to transmit the first service.

For example, the first data frame is an OSU frame, and the routing label stack information and the service attribute information are carried in the payload area of the OSU frame.

For example, the routing label stack information includes a plurality of labels, each of the plurality of labels is in a one-to-one correspondence with a channel through which each node on the first path transmits the first service, and a correspondence is pre-configured in each node on the first path.

For example, the service attribute information includes one or more of the following information: a service identifier ID, a bandwidth, a latency, a source node identifier ID, a destination node identifier ID, and a service path attribute.

For example, the payload area further includes a label number, and the label number identifies a number of nodes that receive the routing label stack information and the service attribute information on the first path.

For example, the overhead area of the OSU frame includes a signaling type field, and the type field indicates that the OSU frame is a control frame and indicates a specific control type. For example, the type field includes 12 bits, where the most significant four bits 1000 identify that the OSU frame is a large type of control signaling, and the least significant eight bits 00000010 identify that the OSU frame is specifically a service path establishment control type. For example, the type field may indicate that the OSU frame is a first service creation control frame. For another example, the type field may indicate that the OSU frame is a first service 1+1 protection creation control frame. For another example, the type field may further indicate that the OSU frame is a first service rerouting control frame.

For example, when the type field indicates that the OSU frame is a service 1+1 protection creation control frame, there are two cases: The type field indicates that the OSU frame is a primary path creation control frame of the first service; or the type field indicates that the OSU frame is a standby path creation control frame of the first service.

It should be noted that when the payload area includes the service path attribute, both the type of the overhead area and the service path attribute of the payload area in this embodiment may identify a specific control type of the OSU frame. A specific field for identification may be selected. This is not limited in this embodiment.

That the second node receives the OSU frame may include: The second node receives an ODUk frame including the OSU frame, and demaps the ODUk frame to obtain the OSU frame.

S1020: The second node obtains the routing label stack information and the service attribute information from the first data frame.

It should be understood that the routing label stack information includes a plurality of labels. That the second node obtains the routing label stack information may be understood as obtaining a second label that is in the plurality of labels and that corresponds to a channel used by the second node to transmit the first service.

Specifically, the second node obtains the second label in two manners: a stack manner and a pointer manner. The two manners are described in detail in the foregoing FIG. 6 and FIG. 7. Details are not described herein again.

S1030: The second node establishes, based on the routing label stack information, the channel used by the second service to transmit the first service, and configures a resource for the first service based on the service attribute information.

For example, a channel associated signaling control unit of the second node sends the routing label stack information and the service attribute information to a service configuration control unit. The service configuration control unit finds corresponding channel information: an ingress board-a port-a channel number and an egress board-a port-a channel number based on the second label of the routing label stack information, and then establishes a cross-connection for a single-node service. A bandwidth is delivered to device hardware to take effect based on basic service attribute information.

Figure 11:
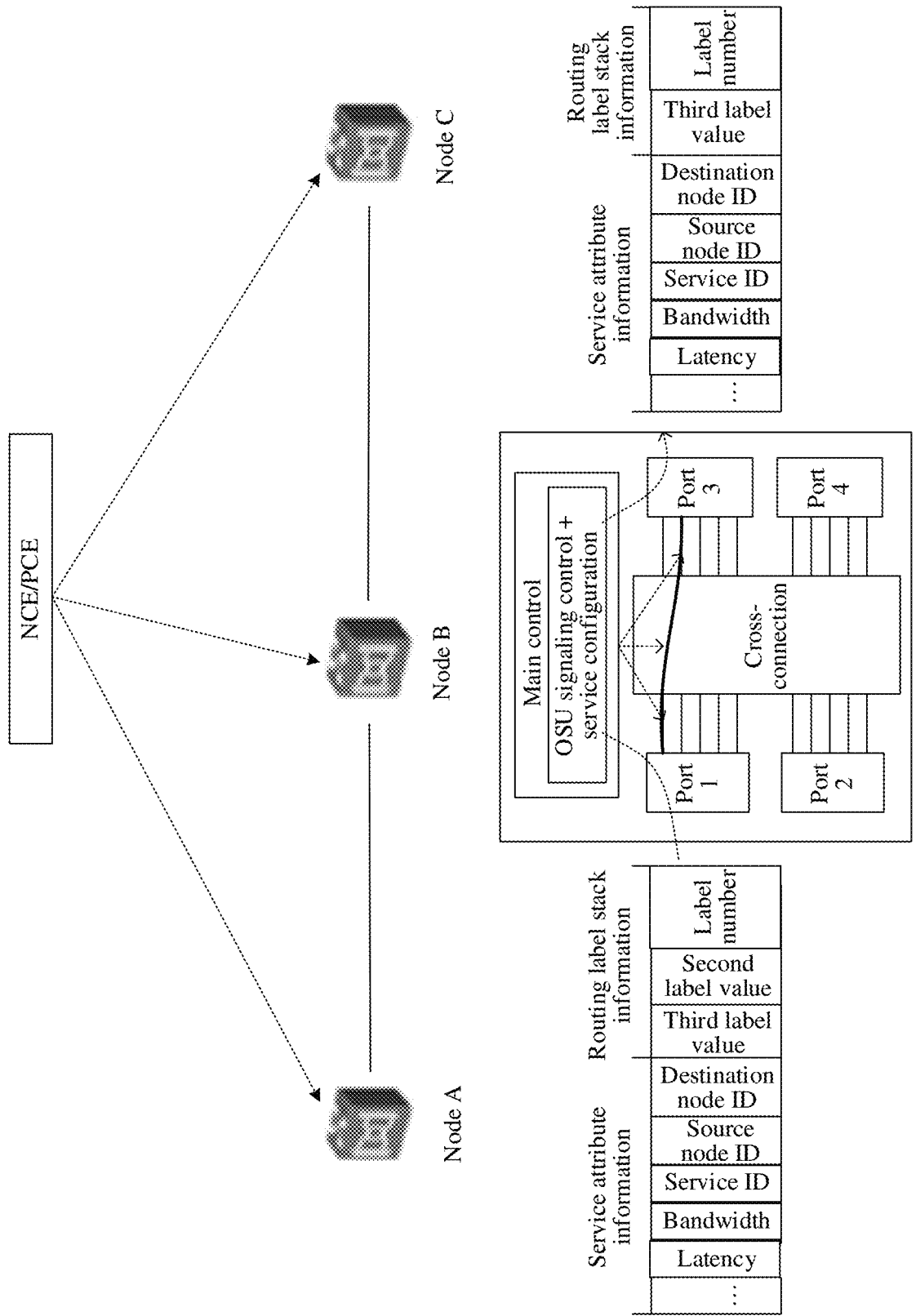
FIG. 11 is a diagram of a scenario to which a service routing method can be applied according to an embodiment of this application.

FIG. 11 is a diagram of a scenario to which a service routing method can be applied according to an embodiment of this application.

As shown in FIG. 11, an application network of the scenario is a GMPLS/ASON network, and has an ASON automation function. The ASON network shown in FIG. 11 has three nodes: A, B, and C. In this embodiment, the ASON function is enabled on the nodes A, B, and C, and a channel associated signaling control apparatus and a service configuration control apparatus are deployed on each node. Network information such as network-wide nodes and links is automatically obtained through OSPF of an ASON protocol or based on open shortest path first-traffic engineering (OSPF-TE). An end-to-end service path is automatically established and restored through an RSVP-TE of the ASON protocol. A PCE automatically obtains network-wide node, link, and service information based on the OSPF, a path computation element communication protocol (PCEP), or the like. The PCE mainly processes end-to-end path computation of a network service centrally, and may be deployed on a server network management system, or a similar device. If there is no PCE in a network, an end-to-end path of the network service may be computed by each node in a distributed manner.

In this embodiment, FIG. 11 is described by using an example in which an end-to-end single service is established through OSU frame control signaling.

In the scenario shown in FIG. 11, the service routing method provided in this embodiment of this application includes the following steps.

Step 1:

Before a service is created, a network device pre-configures a mapping relationship between an OSU frame and an ODUk channel. Through the foregoing pre-configuration, the network device may simplify a service path establishment process into a cross-connection and resource configuration, thereby improving service configuration efficiency.

In addition, the network device further separately allocates a routing label to OSU frame channels on different subracks, boards, and ports, where the label is used to uniquely identify, in a station node, a channel for transmitting a first service, and then configures all routing labels for nodes respectively. For example, each routing label attribute is four bytes that are in a one-to-one correspondence with a subrack, a board, a port, and a channel number in a node. In addition, the network device may store a routing label of each node in the device.

Step 2:

A node A receives a creation request of the first service, and therefore requests the network device to compute a service path. The creation request includes bandwidth information of the first service. In this embodiment of this application, the network device can obtain a service and a topology in a network, then determine, based on network-wide routing TE and the bandwidth information, a working path that carries the first service, and then convert the working path into routing label stack information. The routing label stack information indicates each node on the working path to establish a channel for transmitting the first service. Then, the network device delivers the routing label stack information to the node A.

For example, the network device determines, through computation, that the path that carries the first service is a first path, where the first path includes a node through which the service passes and service channel information in the node. For example, the first path is: node A (subrack 1-board 1-port 1-channel 1)-node B (subrack 2-board 2-port 2-channel 2)-node C (subrack 3-board 3-port 3-channel 3). Then, the network device converts the first path into the routing label stack information, for example, node A (first label)-node B (second label)-node C (third label).

It should be noted that in this embodiment of this application, establishment indicates that a service channel in the node is in an available/active state, or more specifically, establishment indicates that a cross-connection of the channel for transmitting the service in the node has been established.

It should be further noted that if the node A has a path computation element, after receiving the creation request of the first service, the node A may alternatively compute the service path.

Step 3:

The node A receives the routing label stack information delivered by the network device. The first node A identifies, based on the creation request of the first service, that service creation needs to be performed through OSU frame control signaling.

The node A inserts the routing label stack information into a field of the OSU frame. In addition, the node A may further insert service attribute information into the field of the OSU frame, to indicate a node on the service path to configure a resource for the service. For example, the service attribute information includes the following information: a service identifier ID, a bandwidth, a latency, a source node identifier ID, and a destination node identifier ID. Then, the node A sends the OSU frame to the node B.

Before the node A sends the OSU frame to the node B, the method further includes: An OSU frame signaling packet is encapsulated and mapped to a higher-order ODUk frame, and then the ODUk frame is sent to the node B.

After the node A sends the OSU frame to the node B, the method further includes: The node A establishes a cross-connection for the service at a physical layer based on the first label in the routing label stack information, and configures a resource for the service at the physical layer based on the service attribute information, for example, allocates a bandwidth to the service. The reason why the OSU frame is first sent to the node B, and then cross-connection establishment and resource configuration are performed is to transmit the OSU frame control signaling to a peer end of the working path as soon as possible, and each node completes the cross-connection and the resource configuration of the service channel in parallel, thereby shortening routing time.

For example, an overhead area of the OSU frame includes a 12-byte type, to identify that a type of the OSU frame is a control frame and identify a specific control type. For example, the most significant four bits 1000 of the type identify that the OSU frame is a control signaling type, and the least significant eight bits 00000010 identify that the OSU frame is specifically a first service creation control type. A payload area is a customized field, carrying the routing label stack information and the service attribute information. For a packet format of the OSU frame and a specific field meaning of a customized field in the payload area, refer to the foregoing embodiment shown in FIG. 5. Details are not described herein again.

Step 4:

After obtaining the routing label stack information and the service attribute information, the node B directly forwards the OSU frame to a downstream node of the node B, that is, the node C, and then performs processing of the node. The reason for this is that the OSU frame control signaling is enabled to be transmitted to the peer end of the working path as soon as possible, and each node completes the cross-connection and the resource configuration of the service channel in parallel, thereby shortening routing time.

It should be understood that the routing label stack information includes a plurality of labels, and that the node B obtains the routing label stack information may be understood as obtaining a second label that is in the plurality of labels and that corresponds to a channel used by the node B to transmit the service. Specifically, the node B obtains the second label in two manners: a stack manner and a pointer manner. The two manners are described in detail in the foregoing FIG. 6 and FIG. 7. Details are not described herein again.

After forwarding the OSU frame to the downstream node of the node B, the node B establishes a cross-connection for the service at the physical layer based on the routing label stack information, establishes a channel for transmitting the service, and configures a resource for the service based on the service attribute information, for example, allocates a bandwidth to the service.

Step 5:

The node C obtains the routing label stack information and the service attribute information in the OSU frame, and completes establishment of the cross-connection and the resource configuration. The node C is a last node of the service, and when it is identified that only the last label in the routing label stack information is left, it is determined that forwarding does not need to be continued. The node C separately completes establishment of the cross-connection and the resource configuration based on the routing label stack information and the service attribute information. For a specific process, refer to the foregoing steps. Details are not described herein again.

Step 6:

The node C sends a response message to the node A, indicating that the service is successfully created.

Specifically, when the network device is another device deployed independently of the node A, for example, a PCE controller, the node C may also send a response message to the another device. For example, the node C sends a response message to an NCE.

The data frame sending method shown in FIG. 11 mainly includes the following two key points: (1) A single-node OTN data frame mapping relationship and a routing label are pre-configured. A mapping relationship between an OSU frame channel and an ODUk channel is pre-configured, and a channel bandwidth of the OSU frame is set to 0, to simplify a sending process of a data frame into a cross-connection and resource configuration, thereby improving service configuration efficiency. A single node configures a correspondence between a label and a service channel. (2) An OSU frame control signaling packet is first forwarded in a channel-associated manner to establish an end-to-end path of a service. After the end-to-end service is successfully established, a data frame is sent, and a control frame is no longer sent.

Figure 12:
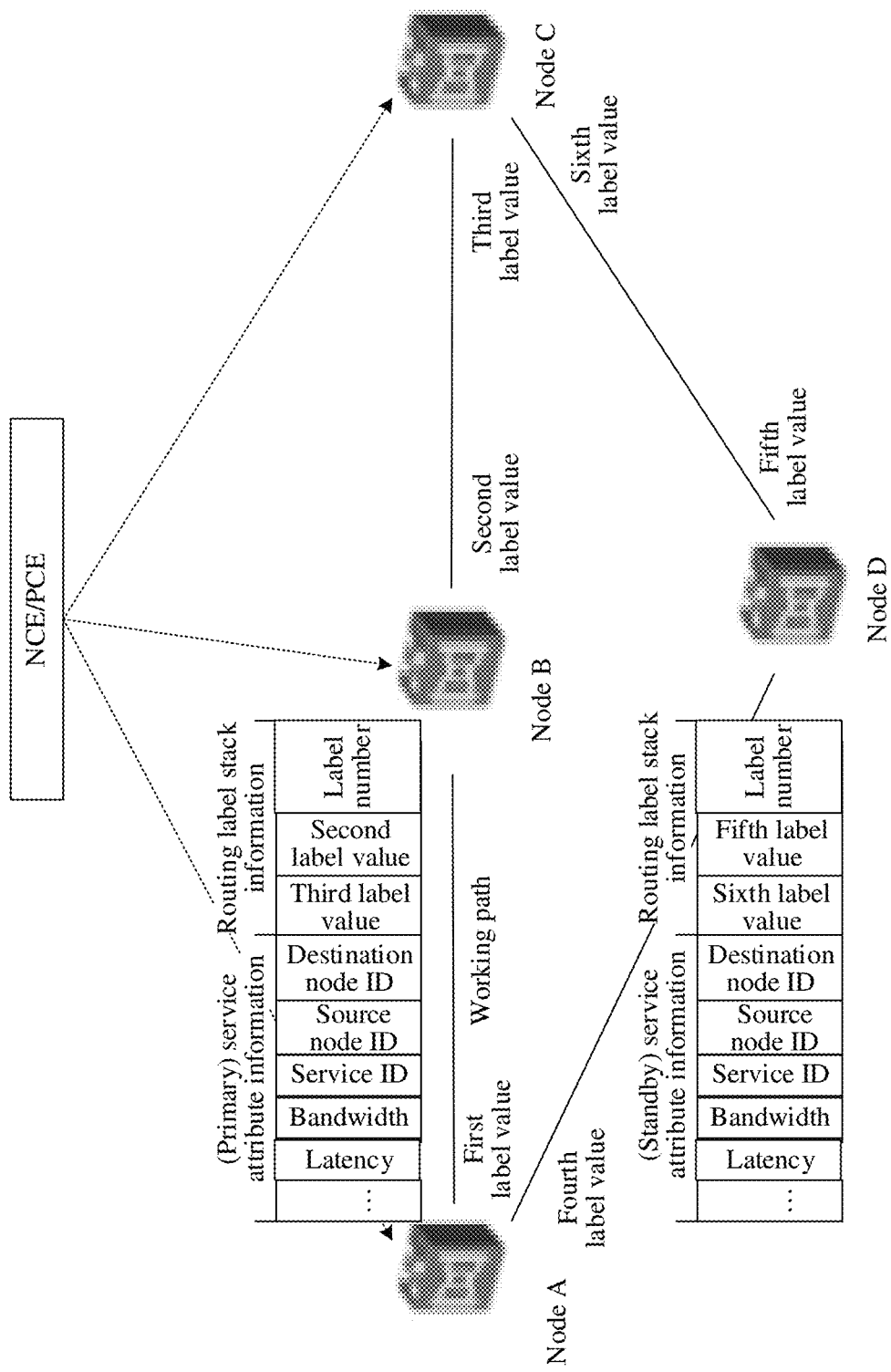
FIG. 12 is a diagram of a scenario to which another service routing method can be applied according to an embodiment of this application.

FIG. 12 is a diagram of a scenario to which another service routing method is applied according to an embodiment of this application.

As shown in FIG. 12, an application network of the scenario is a GMPLS/ASON network, and has an ASON automation function. The ASON network shown in FIG. 12 has four nodes: A, B, C, and D. In this embodiment, the ASON function is enabled on the nodes A, B, C, and D, and a channel associated signaling control apparatus and a service configuration control apparatus are deployed on each node. Network information such as network-wide nodes and links is automatically obtained through OSPF of an ASON protocol or based on OSPF-TE. An end-to-end service path is automatically established and restored through an RSVP-TE of the ASON protocol. A PCE automatically obtains network-wide node, link, and service information based on the OSPF or a PCEP. The PCE mainly processes end-to-end path computation of a network service centrally, and may be deployed on a server network management system, or a similar device. If there is no PCE in a network, an end-to-end path of the network service may be computed by each node in a distributed manner.

In this embodiment, FIG. 12 is described by using an example in which a 1+1 service is established through OSU frame control signaling. A principle of fast creating the 1+1 service is basically the same as that of creating a single service shown in FIG. 11. A primary working path is first created through the OSU frame control signaling to quickly create a service, and then a standby protection path is created. A service protection group is configured for convergence nodes (that is, a first node and a last node) of the primary/standby path through extending attributes of the primary/standby path and unique service ID association.

In the scenario shown in FIG. 12, the service routing method provided in this embodiment of this application includes the following steps.

Step 1:

Before a service is created, a network device pre-configures a mapping relationship between an OSU frame and an ODUk channel. For a specific configuration process, refer to the foregoing embodiments. Details are not described herein again.

Step 2:

A node A receives a 1+1 creation request of a first service, and therefore requests the network device to compute primary and standby paths of the first service. For example, the network device, through computation, determines that a working path of the first service is: node A (subrack 1-board 1-port 1-channel 1)-node B (subrack 2-board 2-port 2-channel 2)-node C (subrack 3-board 3-port 3-channel 3), and determines that a protection path of the first service is: node A (subrack 2-board 1-port 1-channel 1)-node B (subrack 3-board 2-port 2-channel 2)-node C (subrack 4-board 4-port 3-channel 3).

The network device converts the working path into routing label stack information: node A+label 1-node B+label 2-node C+label 3; and converts the protection path into routing label stack information: node A+label 4-node B+label 5-node C+label 6.

The network device delivers the routing label stack information of the working path and the routing label stack information of the protection path of the first service to the node A. The foregoing routing label stack information may be one message or may be a collective name of a plurality of messages. That is, the routing label stack information of the working path and the routing label stack information of the protection path may be sent to the node A through one message, or may be sent to the node A through two or more messages. For example, the network device first delivers the routing label stack information of the working path to the node A, and then delivers the routing label stack information of the protection path to the node A.

Step 3:

The node A receives the routing label stack information of the working path and the routing label stack information of the protection path. The first node A identifies, based on the creation request of the first service, that 1+1 service creation needs to be performed through OSU frame control signaling.

The node A first inserts the routing label stack information of the working path into a payload field of a first OSU frame. In addition, the node A may further insert service attribute information into the payload field of the first OSU frame, to indicate a node on the working path to configure a resource for the first service. For example, the service attribute information includes the following information: a service identifier ID, a bandwidth, a latency, a source node identifier ID, and a destination node identifier ID, and/or the node B inserts the routing label stack information of the protection path into a field of a second OSU frame. Similarly, the second OSU frame may also carry the service attribute information. Then, the node A sends the first OSU frame and/or the second OSU frame to a downstream node.

Different from the scenario shown in FIG. 11, the service attribute information in this embodiment further includes path attribute information, to identify a specific control type of a current OSU frame. For example, the service attribute information carried in the first OSU frame includes the path attribute information, to identify that the first OSU frame is a working path creation control frame of the first service. For another example, the service attribute information carried in the second OSU frame includes the path attribute information, to identify that the second OSU frame is a protection path creation control frame of the first service.

For fields included in the customized fields of the payload and specific meanings of the fields, refer to Table 2.

TABLE 2

| Field name | Meaning | Value |
|---|---|---|
| Label Num | Number of end-to-end routing labels | 16-bit value |
| Label (list) | Routing label stack information, and Label of each node, identifying an egress interface | 32-bit value |
| Source Node ID | Source node ID of a service, identifying a first node of the service | 32-bit value |
| Dest Node ID | Last node ID of the service, identifying the last node of the service (optional) | 32-bit value |
| Service ID | Service ID, and unique identifier ID of an end-to-end path | 32-bit value |
| Bandwidth | Service bandwidth attribute | 32-bit value |
| Latency | Service latency attribute | 32-bit value |
| Path Type | Service path attribute: working/protection path | 8-bit value |
| Reserved | Reserved byte, for future service attribute extension | |

It should be noted that the type in an overhead area of the OSU frame may also identify a specific control type of the OSU frame, and occupies 12 bits in the overhead area, where the most significant four bits identify a type of a control frame, and the least significant eight bits identify a specific control type.

Before the node A sends the first OSU frame and/or the second OSU frame to the node B, the method further includes: A first OSU frame signaling packet and/or a second OSU frame signaling packet are/is encapsulated and mapped to a higher-order ODUk frame, and then the ODUk frame is sent to the node B.

For example, the node A first sends the first OSU frame to the node B, and then sends the second OSU frame after the working path of the first service is established. After the node A first sends the first OSU frame to the node B, the method further includes: The node A establishes a cross-connection for the service at a physical layer based on a first label in the routing label stack information of the working path; and the node A configures a working path resource for the service at the physical layer based on the service attribute information, for example, allocates a working bandwidth to the service. The reason why the first OSU frame is first sent to the node B is to quickly establish the service. After the service is established, the node A sends the second OSU frame to establish the protection path of the first service.

It should be noted that, when creating a cross-connection of the protection path, the node A serving as the first node of the first service may perform local search and association based on a unique service ID. If finding that the cross-connection of the working path has been established, the node A starts to create the cross-connection of the protection path, that is, create a service protection group, and delivers the service protection group to hardware to take effect.

Step 4 to step 6 in this scenario are the same as step 4 to step 6 in the scenario in FIG. 11. For details, refer to descriptions in the foregoing embodiment. Details are not described herein again.

Figure 13:
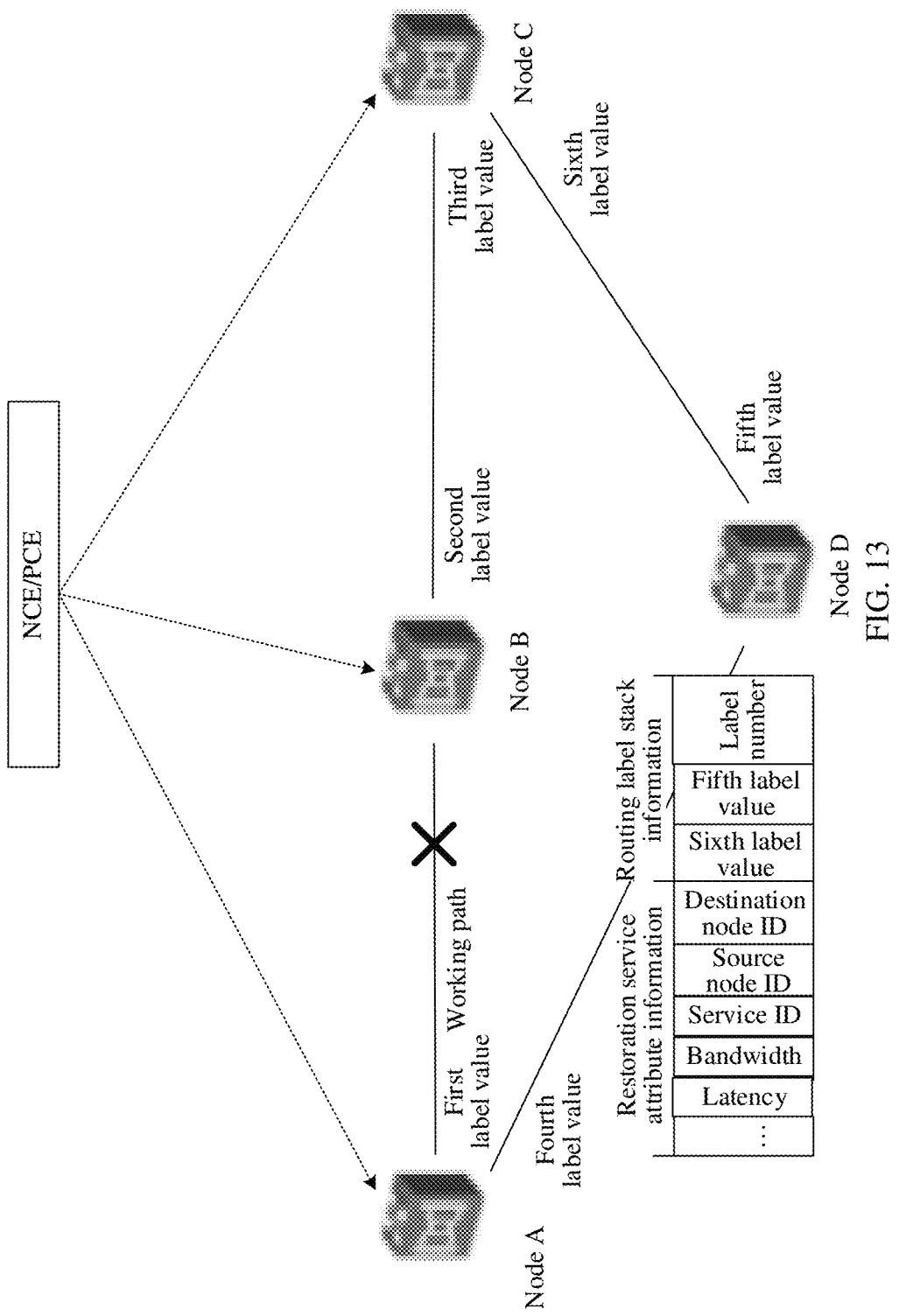
FIG. 13 is a diagram of a scenario to which still another service routing method can be applied according to an embodiment of this application.

FIG. 13 is a diagram of a scenario to which another service routing method is applied according to an embodiment of this application.

As shown in FIG. 13, an application network of the scenario is a GMPLS/ASON network, and has an ASON automation function. The ASON network shown in FIG. 13 has four nodes: A, B, C, and D. In this embodiment, the ASON function is enabled on the nodes A, B, C, and D, and a channel associated signaling control apparatus and a service configuration control apparatus are deployed on each node. Network information such as network-wide nodes and links is automatically obtained through OSPF of an ASON protocol or based on OSPF-TE. An end-to-end service path is automatically established and restored through an RSVP-TE of the ASON protocol. A PCE automatically obtains network-wide node, link, and service information based on the OSPF or a PCEP. The PCE mainly processes end-to-end path computation of a network service centrally, and may be deployed on a server network management system, or a similar device. If there is no PCE in a network, an end-to-end path of the network service may be computed by each node in a distributed manner.

This embodiment is described by using an example in which service rerouting is performed through OSU frame control signaling.

In the scenario shown in FIG. 13, the service routing method provided in this embodiment of this application includes the following steps.

Step 1:

Before a service is created, a network device pre-configures a mapping relationship between an OSU frame and an ODUk channel. For a specific configuration process, refer to the foregoing embodiments. Details are not described herein again.

Step 2:

A current working path of a first service is A-B-C. When the first service is created, the network device or an NCE computes a restoration path A-D-C of the first service based on network-wide nodes and a topology, converts the restoration path into routing label stack information, and delivers the routing label stack information to the first node A. The first node A stores the routing label stack information.

Step 3:

When a fault occurs on A-B on the working path of the first service, for example, a fiber cut, the first node A perceives that the working path of the first service is faulty, and directly enables a local end-to-end restoration path to restore the service. The restoration path is A-D-C.

Specifically, the first node A inserts the routing label stack information of the restoration path into a payload field of the OSU frame. In addition, the node A may further insert service attribute information into the payload field of the OSU frame, to indicate a node on the restoration path to configure a resource for the first service. For example, the service attribute information includes the following information: a service identifier ID, a bandwidth, a latency, a source node identifier ID, and a destination node identifier ID. Then, the node A sends the OSU frame to the node D.

It should be noted that the service attribute information in this embodiment also includes path attribute information, to identify a specific control type of a current OSU frame. Different from the scenario shown in FIG. 12, the path attribute information carried in the OSU frame identifies that the OSU frame is a restoration path creation control frame of the first service, that is, a rerouting control frame of the first service.

For fields included in the customized fields of the payload and specific meanings of the fields, refer to Table 3.

TABLE 3

| Field name | Meaning | Value |
| --- | --- | --- |
| Label Num | Number of end-to-end routing labels | 16-bit value |
| Label (list) | Routing label stack information, and Label of each node, identifying an egress interface | 32-bit value |
| Source Node ID | Source node ID of a service, identifying a first node of the service | 32-bit value |
| Dest Node ID | Last node ID of the service, identifying the last node of the service (optional) | 32-bit value |
| Service ID | Service ID, and unique identifier ID of an end-to-end path | 32-bit value |
| Bandwidth | Service bandwidth attribute | 32-bit value |
| Latency | Service latency attribute | 32-bit value |
| Path Type | Service path attribute: rerouting path | 8-bit value |
| Reserved | Reserved byte, for future service attribute extension | |

It should be noted that the type in an overhead area of the OSU frame may also identify a specific control type of the OSU frame, and occupies 12 bits in the overhead area, where the most significant four bits identify a type of a control frame, and the least significant eight bits identify a specific control type.

After the node A sends the OSU frame to the node B, the method further includes: The node A establishes a cross-connection for service restoration at a physical layer based on a first label in the routing label stack information of the restoration path; and the node A configures a restoration path resource for the service at the physical layer based on the service attribute information, for example, allocates a restoration bandwidth to the service. The reason why the OSU frame is first sent to the node B, and then cross-connection establishment and resource configuration are performed is to transmit the OSU frame control signaling to a peer end of the restoration path as soon as possible, and each node completes a cross-connection and resource configuration of a service channel in parallel, thereby shortening service rerouting time.

Step 4 to step 6 in this scenario are the same as step 4 to step 6 in the scenario in FIG. 11. For details, refer to descriptions in the foregoing embodiment. Details are not described herein again.

Figure 14:
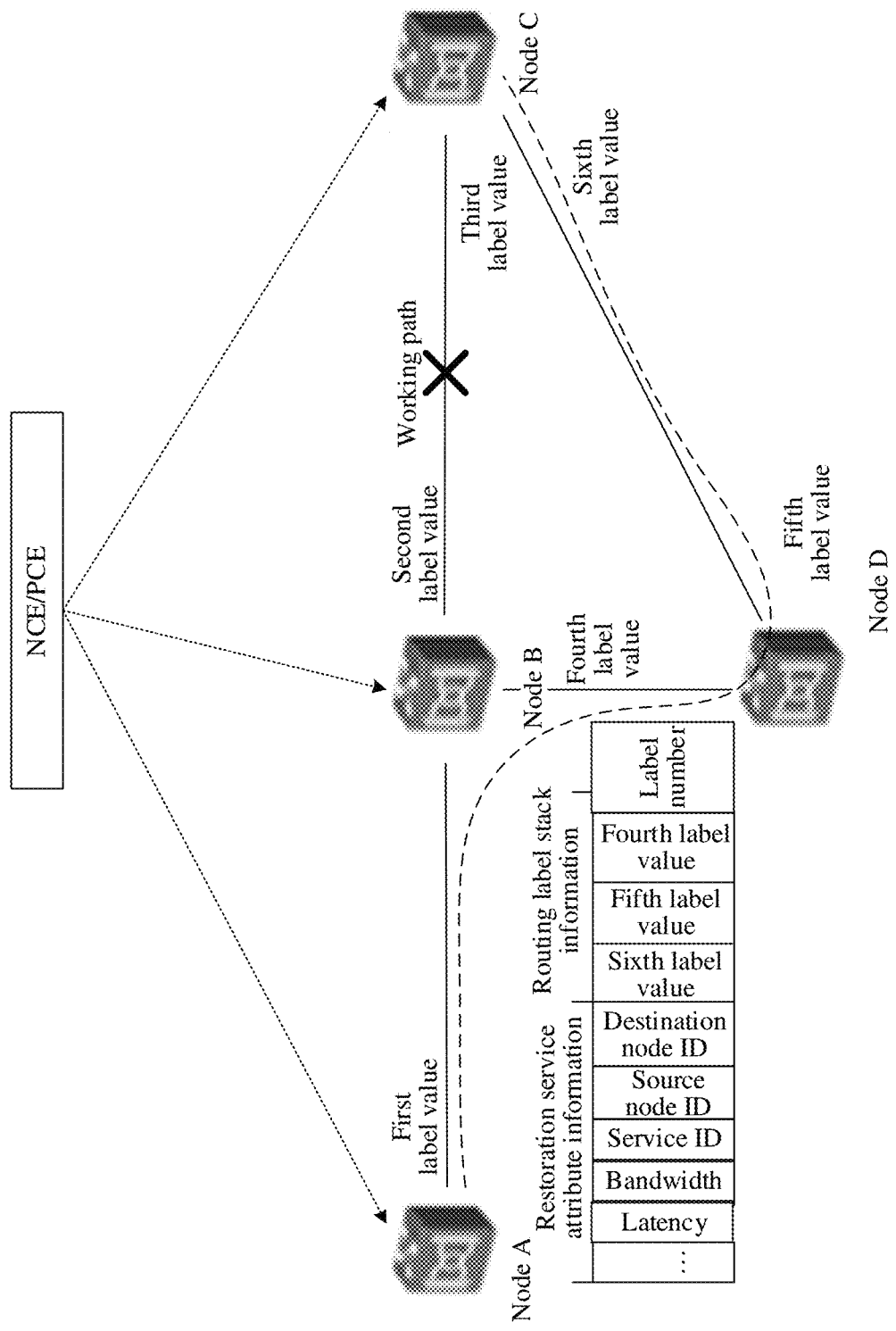
FIG. 14 is a diagram of a scenario to which yet another service routing method can be applied according to an embodiment of this application.

FIG. 14 is a diagram of a scenario to which another service routing method is applied according to an embodiment of this application.

As shown in FIG. 14, an application network of the scenario is a GMPLS/ASON network, and has an ASON automation function. The ASON network shown in FIG. 14 has four nodes: A, B, C, and D. In this embodiment, the ASON function is enabled on the nodes A, B, C, and D, and a channel associated signaling control apparatus and a service configuration control apparatus are deployed on each node. Network information such as network-wide nodes and links is automatically obtained through OSPF of an ASON protocol or based on OSPF-TE. An end-to-end service path is automatically established and restored through an RSVP-TE of the ASON protocol. A PCE automatically obtains network-wide node, link, and service information based on the OSPF or a PCEP. The PCE mainly processes end-to-end path computation of a network service centrally, and may be deployed on a server network management system, or a similar device. If there is no PCE in a network, an end-to-end path of the network service may be computed by each node in a distributed manner.

In this embodiment, FIG. 14 is described by using an example in which section restoration of a service is performed through OSU frame control signaling.

In the scenario shown in FIG. 14, the service routing method provided in this embodiment of this application includes the following steps.

Step 1:

Before a service is created, a network device pre-configures a mapping relationship between an OSU frame and an ODUk channel. For a specific configuration process, refer to the foregoing embodiments. Details are not described herein again.

Step 2:

A current working path of a first service is A-B-C. When the first service is created, the network device or an NCE computes a restoration path A-B-D-C of the first service based on network-wide nodes and a topology, converts the restoration path into routing label stack information, and delivers the routing label stack information to the first node A. The first node A stores the routing label stack information.

Step 3:

When a fault occurs on a B-C link on the working path of the first service, for example, a fiber cut, the node B perceives that the working path of the first service is faulty, finds an affected service, and notifies the affected service to the first node A of the first service. When the first node A perceives that the B-C link is faulty, the restoration path A-B-D-C corresponding to the first service is locally found and matched, and the local end-to-end restoration path A-B-D-C is enabled directly to restore the service.

Specifically, the first node A inserts the routing label stack information of the restoration path into a payload field of the OSU frame. In addition, the node A may further insert service attribute information into the payload field of the OSU frame, to indicate a node on the restoration path to configure a resource for the first service. For example, the service attribute information includes the following information: a service identifier ID, a bandwidth, a latency, a source node identifier ID, and a destination node identifier ID. Then, the node A sends the OSU frame to the node B.

It should be noted that the service attribute information in this embodiment also includes path attribute information, to identify a specific control type of a current OSU frame. The path attribute information carried in the OSU frame identifies that the OSU frame is a restoration path creation control frame of the first service, that is, a rerouting control frame of the first service.

Fields included in the customized fields of the payload area and specific meanings of the fields are the same as those in the scenario in FIG. 13. For details, refer to Table 3. Details are not described herein again.

It should be noted that in this embodiment, the working path and the restoration path share an A-B link. Therefore, a cross-connection and a bandwidth of the node A have been configured, and do not need to be configured repeatedly.

Step 4 to step 6 in this scenario are the same as step 4 to step 6 in the scenario in FIG. 11. For details, refer to descriptions in the foregoing embodiment. Details are not described herein again.

In addition, the service routing method in this application may further be used for deletion of the service. A deletion process includes at least the following steps.

Step 1:
An NCE delivers a deletion request of the service to the first node of the service, for example, the deletion request carries information such as the service ID, the source node ID, and the destination node ID.

Step 2:
The first node A receives the deletion request, locally obtains routing label stack information of a data frame based on the service ID, and inserts the routing label stack information into a customized field in the payload area of the OSU frame. In addition, the node A further inserts the service attribute information into the customized field in the payload area of the OSU frame. The service attribute information may include only the service ID.

A 12-bit type is reserved in an overhead area of the OSU frame, to identify a control type of the OSU frame. For example, the most significant four bits 1000 identify a type of a control frame, and the least significant eight bits 00000011 identify a specific control type of the deletion of the service.

The first node A sends the OSU frame to a downstream node. Because the service already exists, the OSU frame may be directly forwarded with a data flow. From this perspective, the routing label stack information may be optionally carried. After the node A sends the OSU frame, a service configuration control unit in the node A finds, based on the service ID, a service cross-connection that matches and associates the service ID, and delivers a message to a data plane to delete a cross-connection of a service channel.

For subsequent steps, refer to the foregoing path establishment process of the service. Main differences lie in the following two points: (1) Packet content of OSU frame control signaling is different. In this embodiment, the OSU frame may carry only a service deletion control signaling identifier and the service ID, and the routing label stack information may be optionally carried. (2) The OSU frame may be directly forwarded with the service data flow, and does not need to be forwarded through an egress port obtained based on the routing label stack information that is carried in the OSU frame.

Figure 15:
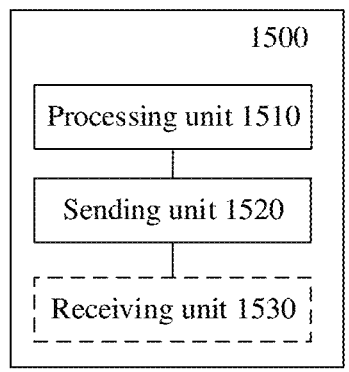
FIG. 15 is a schematic structural diagram of a service routing apparatus according to an embodiment of this application.
Figure 16:
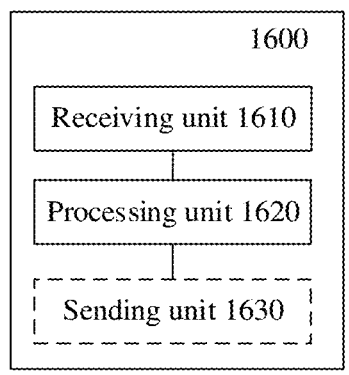
FIG. 16 is a schematic structural diagram of another service routing apparatus according to an embodiment of this application.
Figure 17:
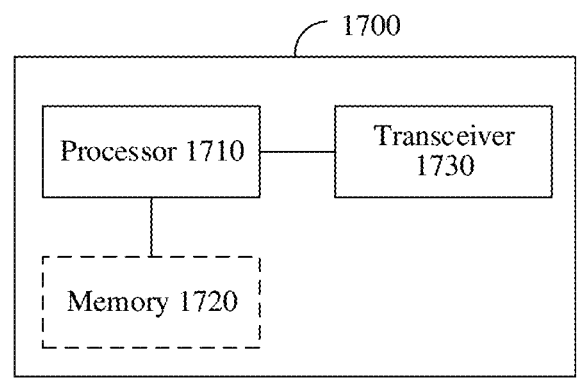
FIG. 17 is a schematic structural diagram of still another service routing apparatus according to an embodiment of this application.

With reference to FIG. 5 to FIG. 14, the foregoing describes in detail the service routing method provided in this application. With reference to FIG. 15 to FIG. 17, the following describes in detail a service routing apparatus provided in embodiments of this application.

FIG. 15 is a schematic diagram of a service routing apparatus 1500 according to this application. As shown in FIG. 15, the apparatus 1500 includes a processing unit 1510 and a sending unit 1520.

The processing unit 1510 is configured to obtain routing label stack information of a service path, where the service path is used to transmit a service, and the routing label stack information indicates each node on the service path to establish a channel for transmitting the service.

The processing unit 1510 is further configured to insert the routing label stack information and service attribute information into an OSU frame, where the service attribute information indicates each node on the service path to configure a resource for the service.

The sending unit 1520 is configured to send the OSU frame.

The apparatus 1500 may further include a receiving unit 1530. Before the processing unit 1510 obtains the routing label stack information of the service path, the receiving unit 1530 is configured to receive a routing request of a service.

The processing unit 1510 is further configured to compute, based on the routing request, a path for transmitting the service. The path may include a service path, a protection path, and a restoration path. The processing unit 1510 is further configured to convert the first path into the routing label stack information.

After the sending unit 1520 sends the OSU frame, the processing unit 1510 is further configured to establish a connection for the service at a physical layer based on a first label in the routing label stack information; and is further adapted to configure a resource for the service at the physical layer based on the service attribute information.

The processing unit 1510 is further configured to pre-configure a mapping relationship between the OSU frame and an optical data unit frame ODUk.

The apparatus 1500 corresponds to the node A in FIG. 5, may be specifically a service first node, and may perform the action performed by the node A in FIG. 5 and the method flowchart shown in FIG. 9. For specific implementation details, refer to the foregoing method embodiments. Details are not described herein again.

The sending unit 1520 and the receiving unit 1530 of the apparatus 1500 may form a transceiver unit that has both receiving and sending functions. The processing unit 1510 may specifically include a channel associated signaling control unit and a service configuration control unit. The processing unit may be at least one processor. The sending unit 1520 may be a transmitter or an interface circuit, and the receiving unit 1530 may be a receiver or an interface circuit. The receiver and the transmitter may be integrated together to form a transceiver or an interface circuit.

Optionally, the apparatus 1500 may further include a storage unit, configured to store data and/or signaling. The processing unit 1510, the sending unit 1520, and the receiving unit 1530 may interact with or be coupled to the storage unit, for example, read or invoke the data and/or the signaling in the storage unit, so that methods in the foregoing embodiments are performed.

The foregoing units may exist independently, or may be all or partially integrated.

FIG. 16 is a schematic diagram of a service routing apparatus 1600 according to this application. As shown in FIG. 16, the apparatus 1600 includes a receiving unit 1610 and a processing unit 1620.

The receiving unit 1610 is configured to receive an OSU frame, where the OSU frame carries routing label stack information, and the routing label stack information indicates each node on a service path to establish a channel for transmitting a service.

The processing unit 1620 is configured to obtain the routing label stack information and service attribute information from the OSU frame, and specifically, obtain a second label from the OSU frame in a stack manner, where the second label specifically indicates a network device to establish the channel for transmitting the service; or the processing unit 1620 obtains a second label from the OSU frame in a pointer manner.

The processing unit 1620 is further configured to establish, based on the routing label stack information, a channel used by a current node to transmit the service, for example, establish a connection for the service at a physical layer based on the second label.

The processing unit 1620 is further adapted to configure a resource for the service based on the service attribute information, for example, configure a bandwidth for the service at the physical layer based on the service attribute information.

The apparatus 1600 may further include a sending unit 1630, configured to forward the OSU frame to another network device after the processing unit 1620 obtains the second label from the OSU frame, where the another network device is a downstream network device of the network device on the service path.

The processing unit 1620 is further configured to pre-configure a mapping relationship between the OSU frame and a second optical data unit frame.

The apparatus 1600 corresponds to the node B in FIG. 5, may be specifically an intermediate node or a last node of the service path, and may perform the actions performed by the node B and the node C in FIG. 5 and the method flowchart shown in FIG. 10. For specific implementation details, refer to the foregoing method embodiments. Details are not described herein again.

The receiving unit 1610 and the sending unit 1630 of the apparatus 1600 may form a transceiver unit that has both receiving and sending functions. The processing unit 1620 may specifically include a channel associated signaling control unit and a service configuration control unit. The processing unit 1620 may be at least one processor. The sending unit 1630 may be a transmitter or an interface circuit, and the receiving unit 1610 may be a receiver or an interface circuit. The receiver and the transmitter may be integrated together to form a transceiver or an interface circuit.

Optionally, the apparatus 1600 may further include a storage unit, configured to store data and/or signaling. The receiving unit 1610, the processing unit 1620, and the sending unit 1630 may interact with or be coupled to the storage unit, for example, read or invoke the data and/or the signaling in the storage unit, so that methods in the foregoing embodiments are performed.

The foregoing units may exist independently, or may be all or partially integrated.

FIG. 17 is a schematic structural diagram of a service routing apparatus 1700 according to an embodiment of this application. The apparatus 1700 includes a processor 1710. The processor 1710 is coupled to a memory 1720. The memory 1720 may be configured to store a computer program or instructions and/or data. The processor 1710 is configured to execute the computer program or the instructions and/or the data stored in the memory 1720, so that methods in the foregoing method embodiments are performed.

The service routing apparatus 1700 further includes a transceiver 1730, configured to receive and/or send signaling.

Optionally, the apparatus 1700 includes one or more processors 1710.

Optionally, as shown in FIG. 17, the apparatus 1700 further includes the memory 1720.

Optionally, the service routing apparatus 1700 may include one or more memories 1720.

Optionally, the memory 1720 and the processor 1710 may be integrated together, or separately disposed.

For example, the processor 1710 is configured to implement related operations performed by a node processing unit in the foregoing method embodiments.

An embodiment of this application further provides a computer program product.

When the computer program is executed by a computer, the computer is enabled to separately implement a method performed by a first node, an intermediate node, or a last node in the foregoing method embodiments.

An embodiment of this application further provides a communication system. The communication system includes the network device and the node in the foregoing embodiments.

A person skilled in the art can appreciate that functions described with reference to various illustrative logical blocks, modules, and algorithm steps disclosed and described in this specification may be implemented by hardware, software, firmware, or any combination thereof. If implemented by software, the functions described with reference to the various illustrative logical blocks, modules, and steps may be stored in or transmitted over a computer-readable medium as one or more instructions or code and executed by a hardware-based processing unit. The computer-readable storage medium corresponds to a tangible medium, for example, a data storage medium, or a communication medium that includes any medium (for example, based on a communication protocol) that facilitates transfer of a computer program from one place to another. In this manner, the computer-readable storage medium may generally correspond to: (1) a non-transitory tangible computer-readable storage medium, or (2) a communication medium such as a signal or a carrier. The data storage medium may be any usable medium that can be accessed by one or more computers or one or more processors to retrieve instructions, code, and/or data structures for implementing technologies described in this application. A computer program product may include a computer-readable storage medium.

For example, such computer-readable storage media may include a RAM, a ROM, an EEPROM, a CD-ROM or another optical disc storage apparatus, a magnetic disk storage apparatus or another magnetic storage apparatus, a flash memory, or any other medium that can store required program code in a form of instructions or data structures and that can be accessed by a computer. In addition, any connection is properly referred to as a computer-readable medium. For example, if instructions are transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include a connection, a carrier, a signal, or another transitory medium, but actually mean a non-transitory tangible storage medium. Disks and discs used in this specification include a compact disc (CD), a laser disc, an optical disc, a digital versatile disc (DVD), and a Blu-ray disc. The disks usually reproduce data magnetically, and the discs reproduce data optically via lasers. Combinations of the above should also be included within the scope of the computer-readable medium.

Instructions may be executed by one or more processors such as one or more digital signal processors (DSPs), a general microprocessor, an application-specific integrated circuit (ASIC), a field programmable gate array (FPGA), or another equivalent integrated circuit or discrete logic circuit. Therefore, the term "processor" used in this specification may refer to the foregoing structure, or any other structure that may be applied to implementation of the technologies described in this specification. In addition, the functions described with reference to the illustrative logical blocks, modules, and steps described in this specification may be provided within dedicated hardware and/or software modules configured for encoding and decoding, or may be incorporated into a combined codec. In addition, the technologies may be completely implemented in one or more circuits or logic elements.

In addition, the term "and/or" in this application is only an association relationship for describing associated objects and indicates that three relationships may exist. For example, A and/or B may indicate the following three cases: Only A exists, both A and B exist, and only B exists. In addition, the character "/" in this specification usually indicates an "or" relationship between associated objects. The term "at least one" in this application may represent "one" and "two or more". For example, at least one of A, B, and C may indicate the following seven cases: Only A exists, only B exists, only C exists, both A and B exist, both A and C exist, both C and B exist, and A, B, and C exist.

The foregoing descriptions are merely example specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   obtaining, by a first node, routing label stack information of a first path, wherein the first path is used to transmit a service, and the routing label stack information indicates to each node on the first path to establish a channel of the service on the respective node of the first path;
   inserting, by the first node, the routing label stack information and service attribute information into a payload area of a first data frame, wherein the service attribute information indicates to each node on the first path to configure a resource for the service,
   wherein the payload area comprises a first field associated with the routing label stack information and the routing label stack information is inserted into the first field of the payload area, and wherein the payload area comprises a second field and the service attribution information is inserted into the second field; and
   sending, by the first node, the first data frame to at least a downstream node further in the first path, and configuring, in parallel with or upon completion of the sending of the first data frame to the downstream node by the first node, of at least the resource for the service.

2. The method according to claim 1, wherein the routing label stack information comprises a plurality of labels, each label of the plurality of labels is pre-configured in each node of the first path with a one-to-one correspondence with a channel of the service.

3. The method according to claim 1, wherein the service attribute information comprises one or more of the following information: a service identifier (ID), a bandwidth, a latency, a source node ID, a destination node ID, or a service path attribute.

4. The method according to claim 1, wherein a length of the first data frame is 192 bytes, 240 bytes, 128 bytes, or 64 bytes.

5. The method according to claim 1, wherein the payload area further comprises a label number, and the label number identifies a number of nodes that receive the routing label stack information and the service attribute information on the first path.

6. The method according to claim 1, wherein an overhead area of the first data frame further comprises a signaling type field, and the signaling type field indicates a frame type of the first data frame.

7. The method according to claim 6, wherein:
   the signaling type field indicates that the first data frame is a service creation data frame;
   the signaling type field indicates that the first data frame is a service 1+1 protection creation data frame; or
   the signaling type field indicates that the first data frame is a service rerouting data frame.

8. The method according to claim 7, wherein the signaling type field indicating that the first data frame is the service 1+1 protection creation data frame comprises:
   the signaling type field indicating that the first data frame is a primary path creation data frame of the service; or
   the signaling type field indicating that the first data frame is a standby path creation data frame of the service.

9. The method according to claim 1, wherein obtaining, by the first node, the routing label stack information of the first path comprises:
   receiving, by the first node, a routing request of the service;
   computing, based on the routing request, the first path for transmitting the service; and
   converting the first path into the routing label stack information.

10. A method, comprising:
    receiving, by a second node, a first data frame, wherein a payload area of the first data frame carries routing label stack information and service attribute information of a first path, the routing label stack information indicates to each node on the first path to establish a channel of a service on the respective node of the first path, the service attribute information indicates to each node on the first path to configure a resource for the service, and the first path is used to transmit the service,
    wherein the payload area comprises a first field associated with the routing label stack information and the routing label stack information is obtained from the first field of the payload area, and wherein the payload area comprises a second field and the service attribution information is obtained from the second field;
    obtaining, by the second node, the routing label stack information and the service attribute information from the first data frame; and
    sending, by the second node, at least a portion of the first data frame to a downstream node further in the first path, and establishing, by the second node in parallel with or upon completion of the sending of at least the portion of the first data frame to the downstream node, a channel of the service on the second node based on the routing label stack information, and configuring a resource for the service based on the service attribute information.

11. The method according to claim 10, wherein the routing label stack information comprises a plurality of labels, each label of the plurality of labels is pre-configured in each node of the first path with a one-to-one correspondence with a channel of the service.

12. The method according to claim 10, wherein the service attribute information comprises one or more of the following information: a service identifier (ID), a bandwidth, a latency, a source node ID, a destination node ID, or a service path attribute.

13. The method according to claim 10, wherein the payload area further comprises a label number, and the label number identifies a number of nodes that receive the routing label stack information and the service attribute information on the first path.

14. The method according to claim 10, wherein establishing, by the second node, the channel of the service on the second node based on the routing label stack information comprises:
establishing, by the second node, a cross-connection for the service at a physical layer based on a second label in parallel with or upon completion of the sending of the first data frame to the downstream node by the second node.

15. A network device, comprising:
a processor, configured to:
obtain routing label stack information of a first path, wherein the first path is used to transmit a service, and the routing label stack information indicates to each node on the first path to establish a channel of the service on the respective node of the first path;
insert the routing label stack information and service attribute information into a payload area of a first data frame, wherein the service attribute information indicates to each node on the first path to configure a resource for the service,
wherein the payload area comprises a first field associated with the routing label stack information and the routing label stack information is inserted into the first field of the payload area, and wherein the payload area comprises a second field and the service attribution information is inserted into the second field; and
configure at least the resource for the service; and
a transmitter, configured to send the first data frame to at least a downstream node further in the first path, wherein the processor is configured to configure at least the resource for the service in parallel with or upon completion of the transmitter sending the first data frame to the downstream node.

16. The network device according to claim 15, wherein the routing label stack information comprises a plurality of labels, each label of the plurality of labels is pre-configured in each node of the first path with a one-to-one correspondence with a channel of the service.

17. The network device according to claim 15, wherein the service attribute information comprises one or more of the following information: a service identifier (ID), a bandwidth, a latency, a source node ID, a destination node ID, and a service path attribute.

18. The network device according to claim 15, wherein a length of the first data frame is 192 bytes, 240 bytes, 128 bytes, or 64 bytes.

19. The network device according to claim 15, wherein the payload area further comprises a label number, and the label number identifies a number of network devices that receive the routing label stack information and the service attribute information on the first path.

20. The network device according to claim 15, wherein an overhead area of the first data frame further comprises a signaling type field, and the signaling type field indicates a frame type of the first data frame.

21. A network device, comprising:
a receiver, configured to receive a first data frame, wherein the first data frame carries routing label stack information and service attribute information of a first path, the routing label stack information indicates to each node on the first path to establish a channel of a service on the respective node of the first path, the service attribute information indicates to each node on the first path to configure a resource for the service, and the first path is used to transmit the service; and
a processor, configured to:
obtain the routing label stack information and the service attribute information from the first data frame, wherein a payload area comprises a first field associated with the routing label stack information and the routing label stack information is obtained from the first field of the payload area, and wherein the payload area comprises a second field and the service attribution information is obtained from the second field;
send at least a portion of the first data frame to a downstream node further in the first path;
establish a channel of the service on the network device based on the routing label stack information; and
configure a resource for the service based on the service attribute information,
wherein the processor is configured to establish the channel of the service on the network device and configure the resource for the service in parallel with or after propagation of the sending of at least the portion of the first data frame to the downstream node.

22. The network device according to claim 21, wherein the routing label stack information comprises a plurality of labels, each label of the plurality of labels is in a one-to-one correspondence with a channel of the service on each network device of the first path, and a correspondence is pre-configured in each network device.

23. The network device according to claim 21, wherein the service attribute information comprises one or more of the following information: a service identifier (ID), a bandwidth, a latency, a source node ID, a destination node ID, and a service path attribute.

24. The network device according to claim 21, wherein obtaining the routing label stack information from the first data frame comprises:
obtaining a second label from the first data frame in a pointer manner based on an incrementing of a pointer value utilized to obtain the second label.

25. The network device according to claim 24, further comprising:
a transmitter, configured to:
and after the processor obtains the second label from the first data frame, forward the routing label stack information and the service attribute information to another network device, wherein the another network device is a downstream network device of the network device on the first path.

26. The network device according to claim 25, wherein establishing the channel of the service on the network device based on the routing label stack information comprises:
    establishing a cross-connection for the service at a physical layer based on the second label in parallel with or upon completion of the sending of the first data frame to the downstream node.

27. The method according to claim 1, wherein the second field comprises a reserved byte, wherein the service attribute information is inserted into the reserved byte.

28. The method according to claim 1, wherein the routing label stack information comprises a global label.

29. The method according to claim 1, wherein a label of the routing label stack information is pre-configured to represent a one-to-one correspondence with a subrack, a board, a port, and a channel number.

30. The method according to claim 29, wherein the label comprises four bytes, the four bytes comprising a first byte indicating the subrack, a second byte indicating the board, a third byte indicating the port, and a fourth byte indicating the channel number.

* * * * *